US009084073B2

(12) United States Patent  (10) Patent No.: US 9,084,073 B2
Patil et al.  (45) Date of Patent: Jul. 14, 2015

(54) METHODS AND APPARATUS FOR INDEX BASED PEER DISCOVERY

(75) Inventors: Shailesh Patil, Bridgewater, NJ (US); Junyi Li, Chester, NJ (US); Hua Wang, Bridgewater, NJ (US); Saurabh Tavildar, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 13/466,934

(22) Filed: May 8, 2012

(65) Prior Publication Data

US 2013/0303223 A1 Nov. 14, 2013

(51) Int. Cl.
*H04W 48/16* (2009.01)
*H04W 8/00* (2009.01)

(52) U.S. Cl.
CPC .................................. *H04W 8/005* (2013.01)

(58) Field of Classification Search
CPC ..... H04H 60/33; H04W 1/0214; H04W 84/02
USPC ......................................................... 455/517
See application file for complete search history.

(56) References Cited

U.S. PATENT DOCUMENTS

| 7,233,801 | B2 * | 6/2007 | Winn ........................... 455/456.5 |
| 7,289,574 | B2 * | 10/2007 | Parolari ........................ 375/295 |
| 7,769,010 | B2 * | 8/2010 | Edlund et al. ................. 370/390 |
| 8,170,906 | B2 * | 5/2012 | Von Schweber et al. .... 705/7.32 |
| 8,520,650 | B2 * | 8/2013 | Esteves et al. ................ 370/338 |
| 8,526,342 | B2 * | 9/2013 | Esteves et al. ................ 370/310 |
| 8,526,992 | B2 * | 9/2013 | Hui et al. ....................... 455/522 |
| 8,743,751 | B2 * | 6/2014 | Li et al. .......................... 370/310 |
| 8,767,669 | B2 * | 7/2014 | Wu et al. ........................ 370/330 |
| 8,913,995 | B2 * | 12/2014 | Vanderveen et al. ......... 455/411 |
| 8,935,766 | B2 * | 1/2015 | Tsirtsis et al. ..................... 726/6 |
| 8,949,997 | B2 * | 2/2015 | Schmidt et al. ................. 726/26 |
| 8,978,113 | B2 * | 3/2015 | Vanderveen et al. ............ 726/5 |
| 2004/0081248 | A1 * | 4/2004 | Parolari ........................ 375/259 |
| 2005/0043043 | A1 * | 2/2005 | Winn .......................... 455/456.5 |
| 2006/0122876 | A1 * | 6/2006 | Von Schweber et al. ....... 705/10 |

(Continued)

FOREIGN PATENT DOCUMENTS

WO 2009158652 A1 12/2009
WO 2011130630 A1 10/2011

OTHER PUBLICATIONS

International Search Report and Written Opinion—PCT/US2013/039930—ISA/EPO—Aug. 12, 2013.

*Primary Examiner* — Hai V Nguyen
(74) *Attorney, Agent, or Firm* — James K. O'Hare

(57) ABSTRACT

Base station assisted peer to peer discovery methods are described. A wireless terminal communicates peer discovery expression information to a base station and information identifying a peer discovery resource that it intends to use but which may also be used by other devices. The base station associates the peer discovery expression and peer discovery resource with an index value to be communicated on the peer discovery resource. The base station transmits the peer discovery expression and information associating the peer discovery expression with the peer discovery resource and the index value. The wireless terminal transmits the index value on the peer discovery resource. A wireless terminal receiving the index value determines the peer discovery expression being communicated using information from the base station. Use of different indexes allows multiple devices to use the same discovery resource.

20 Claims, 18 Drawing Sheets

(56) References Cited

U.S. PATENT DOCUMENTS

| | | | |
|---|---|---|---|
| 2009/0323647 A1* | 12/2009 | Park et al. | 370/338 |
| 2009/0327395 A1* | 12/2009 | Park et al. | 709/202 |
| 2010/0190459 A1 | 7/2010 | Li et al. | |
| 2010/0272029 A1 | 10/2010 | Laroia et al. | |
| 2010/0272081 A1 | 10/2010 | Laroia et al. | |
| 2010/0279729 A1* | 11/2010 | Hui et al. | 455/522 |
| 2011/0039592 A1 | 2/2011 | Haddad et al. | |
| 2011/0268101 A1* | 11/2011 | Wang et al. | 370/344 |
| 2012/0082127 A1* | 4/2012 | Wu et al. | 370/330 |
| 2012/0163235 A1* | 6/2012 | Ho et al. | 370/254 |
| 2012/0167184 A1* | 6/2012 | Vanderveen et al. | 726/5 |
| 2012/0173623 A1* | 7/2012 | Vanderveen | 709/204 |
| 2012/0185924 A1* | 7/2012 | Tsirtsis et al. | 726/6 |
| 2012/0243437 A1* | 9/2012 | Horn et al. | 370/254 |
| 2012/0269115 A1* | 10/2012 | Esteves et al. | 370/328 |
| 2012/0269250 A1* | 10/2012 | Li et al. | 375/227 |
| 2013/0005377 A1* | 1/2013 | Wang et al. | 455/509 |
| 2013/0010661 A1* | 1/2013 | Esteves et al. | 370/310 |
| 2013/0196631 A1* | 8/2013 | Vanderveen et al. | 455/411 |
| 2013/0196693 A1* | 8/2013 | Vanderveen et al. | 455/458 |
| 2013/0196694 A1* | 8/2013 | Vanderveen et al. | 455/458 |
| 2013/0198838 A1* | 8/2013 | Schmidt et al. | 726/22 |
| 2013/0204962 A1* | 8/2013 | Estevez et al. | 709/217 |
| 2013/0259231 A1* | 10/2013 | Wang et al. | 380/270 |
| 2014/0226629 A1* | 8/2014 | Kim et al. | 370/331 |
| 2014/0274066 A1* | 9/2014 | Fodor et al. | 455/437 |
| 2014/0321314 A1* | 10/2014 | Fodor et al. | 370/252 |

* cited by examiner

| FIGURE 13A | FIGURE 13B | FIGURE 13C |

METHODS AND APPARATUS FOR INDEX BASED PEER DISCOVERY

FIELD

Various embodiments are directed to communicating peer discovery information in a wireless communications system, and more specifically, to methods and apparatus for communicating peer to peer discovery information using assistance from an infrastructure node, e.g., assistance from a wide area network (WAN) base station.

BACKGROUND

In a peer to peer system it is often desirable to minimize the duration and amount of power required to transmit peer to peer signals, e.g., peer discovery signals. When a peer to peer system shares communications resources with a wide area network (WAN) or the peer to peer frequency band is close to the frequency band being used by the wide area network, peer to peer discovery signals can create interference to the access nodes, e.g., base stations in the WAN.

In a WAN all communication to/from a mobile node normally goes through an infrastructure element, e.g., base station via uplink/downlink channels between mobiles and base station. Thus, in a WAN, communications with a network element or between mobile nodes normally passes through a base station.

In the case that two communicating mobiles are in the vicinity of each other, direct peer to peer communication without going through a base station can reduce the base station load. However, in such systems, which support WAN and peer to peer communications it can be important not only to minimize the amount of interference to the base station from peer to peer communication, including the transmission of discovery signals, but it can also be important to minimize the amount of transmission power consumed by mobile stations. For example, it may be desirable to minimize the amount of power used for performing peer to peer communications since mobile devices normally are limited in the amount of time they can communicate by the amount of battery power available.

In view of the above discussion, it should be appreciated that there is a need for methods and apparatus that allow peer to peer devices within range of a base station to send and receive peer discovery information in a manner which limits the amount of interference to WAN communications and/or uses available wireless terminal power efficiently.

SUMMARY

Various embodiments relate to methods and apparatus for communicating peer discovery information between wireless terminals, e.g., mobile nodes supporting both WAN and direct peer to peer device communications, using assistance from an infrastructure component, e.g., a WAN component such as a base station. In some embodiments, an index transmitted by a mobile device on a peer to peer discovery communications resource corresponds to a peer discovery expression which is transmitted from a base station. In various embodiments, the index is conveyed by a relatively small number of information bits, e.g., 3 bits or less, while the peer discovery expression communicates a relatively large number of information bits, e.g., 64 bits or more. In some, but not necessarily all, embodiments, the peer discovery signal communicating the index, is transmitted at lower power than the transmission power level used to communicate the peer discovery expression. In various embodiments, a particular peer discovery expression corresponds to combination of a peer discovery resource and a peer discovery index value.

An exemplary method of operating a first wireless terminal, in accordance with some embodiments, comprises: transmitting first peer to peer discovery expression information to a base station, said first peer to peer discovery expression information communicating a first peer to peer discovery expression to be communicated by said base station in association with a first index and a first peer to peer communications resource identifier identifying a first peer to peer discovery communications resource being used by said first wireless terminal or an identifier identifying said first peer to peer discovery expression; and transmitting said first index in the first peer to peer discovery communications resource identified by said first peer to peer communications resource identifier. An exemplary first wireless terminal, in accordance with some embodiments, comprises at least one processor configured to: transmit first peer to peer discovery expression information to a base station, said first peer to peer discovery expression information communicating a first peer to peer discovery expression to be communicated by said base station in association with a first index and a first peer to peer communications resource identifier identifying a first peer to peer discovery communications resource being used by said first wireless terminal or an identifier identifying said first peer to peer discovery expression; and transmit said first index in the first peer to peer discovery communications resource identified by said first peer to peer communications resource identifier. The exemplary first wireless terminal further includes memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
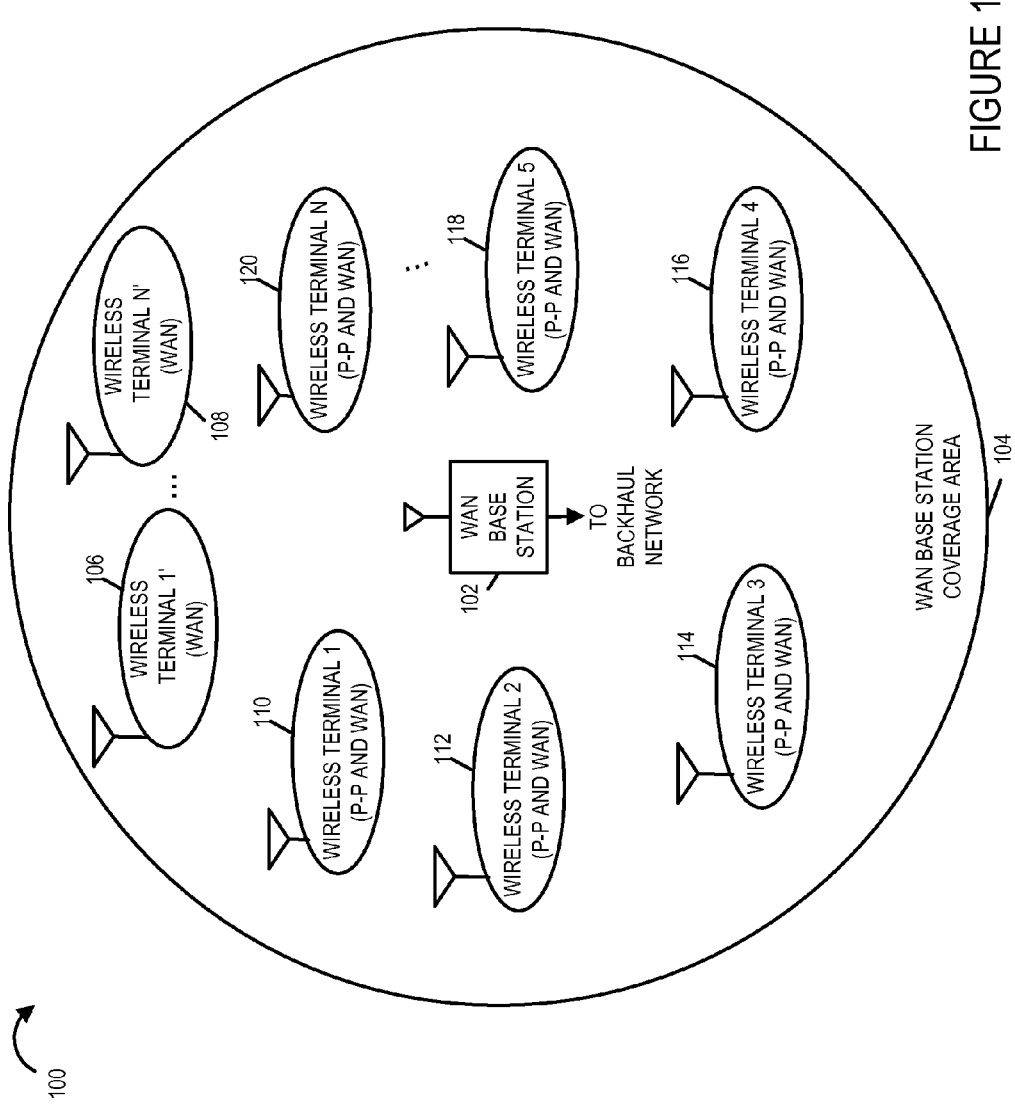
FIG. 1 is a drawing of an exemplary communications system in accordance with an exemplary embodiment.

FIG. 1 is a drawing of an exemplary communications system 100 in accordance with an exemplary embodiment. Communications system 100 includes a wide area network (WAN) base station 102 with a corresponding WAN base station coverage area 104. Exemplary system 100 includes a plurality of wireless terminals supporting WAN communications (WT 1' 106, . . . , WT N' 108), which may communicate with one another via WAN base station 102 using uplink and downlink signals. Communications system 100 also includes a plurality of wireless terminals supporting both peer to peer and WAN signaling (WT 1 110, WT 2 112, WT 3 114, WT 4 116, WT 5 118, . . . , WT N 120). The wireless terminals supporting peer to peer communications (110, 112, 114, 116, 118, . . . , 120) may, and sometimes do, form and participate in a peer to peer networks, e.g., an ad-hoc peer to peer network supporting direct device to device communications, e.g., including peer to peer signals such as peer to peer traffic signals between two mobile devices which do not traverse WAN base station 102. In accordance with a feature of some embodiments, WAN base station 102, assists in the dissemination of peer to peer discovery information. In various embodiments, a wireless terminal, e.g., WT 1 110, transmits an index corresponding to peer to peer discovery information, e.g., a stored peer discovery expression, on a peer to peer discovery resource being used by the wireless terminal. The WAN base station 102 transmits the peer to peer discovery information, e.g., the stored peer discovery expression. In some embodiments, the WAN base station 102 transmits the peer to peer discovery information as a broadcast signal in accordance with a predetermined schedule. In some embodiments, the WAN base station 102 transmits the peer to peer discovery information in response to a request signal from another wireless terminal, e.g., WT 2 112. In various embodiments, the index is conveyed by a peer to peer signal using a relatively small number of information bits, e.g., 3 or less bits, while the peer to peer discovery information is conveyed by a downlink WAN signal using a relatively larger number of information bits, e.g., 64 or more bits. In some embodiments, the transmission power level of peer to peer signal conveying the index is less than the transmission power level of the downlink signal conveying the discovery information. In various embodiments, a wireless terminal, e.g., WT 1 110, transmits an index corresponding to a peer discovery expression on a peer discovery resource that it is currently occupying in a recurring peer to peer timing structure at a higher rate than the WAN base station 102 broadcasts the peer discovery expression. In some embodiments, a wireless terminal, e.g., WT 1 110, holds at most one index corresponding to peer to peer discovery resource at a given time. In some embodiments, a wireless terminal, e.g., WT 1 110, may, and sometimes does hold multiple indexes concurrently corresponding to peer to peer discovery resource at a given time.

There may be, and sometimes are, more than one base station in system 100. The wireless terminals supporting peer to peer and WAN signaling (110, 112, 114, 116, . . . , 118) may move throughout system 100. The wireless terminals supporting peer to peer and WAN signaling (110, 112, 114, 116, . . . , 118) may, and sometimes do form multiple peer to peer networks, e.g., multiple ad-hoc networks within a single WAN base station coverage area.

Figure 2:
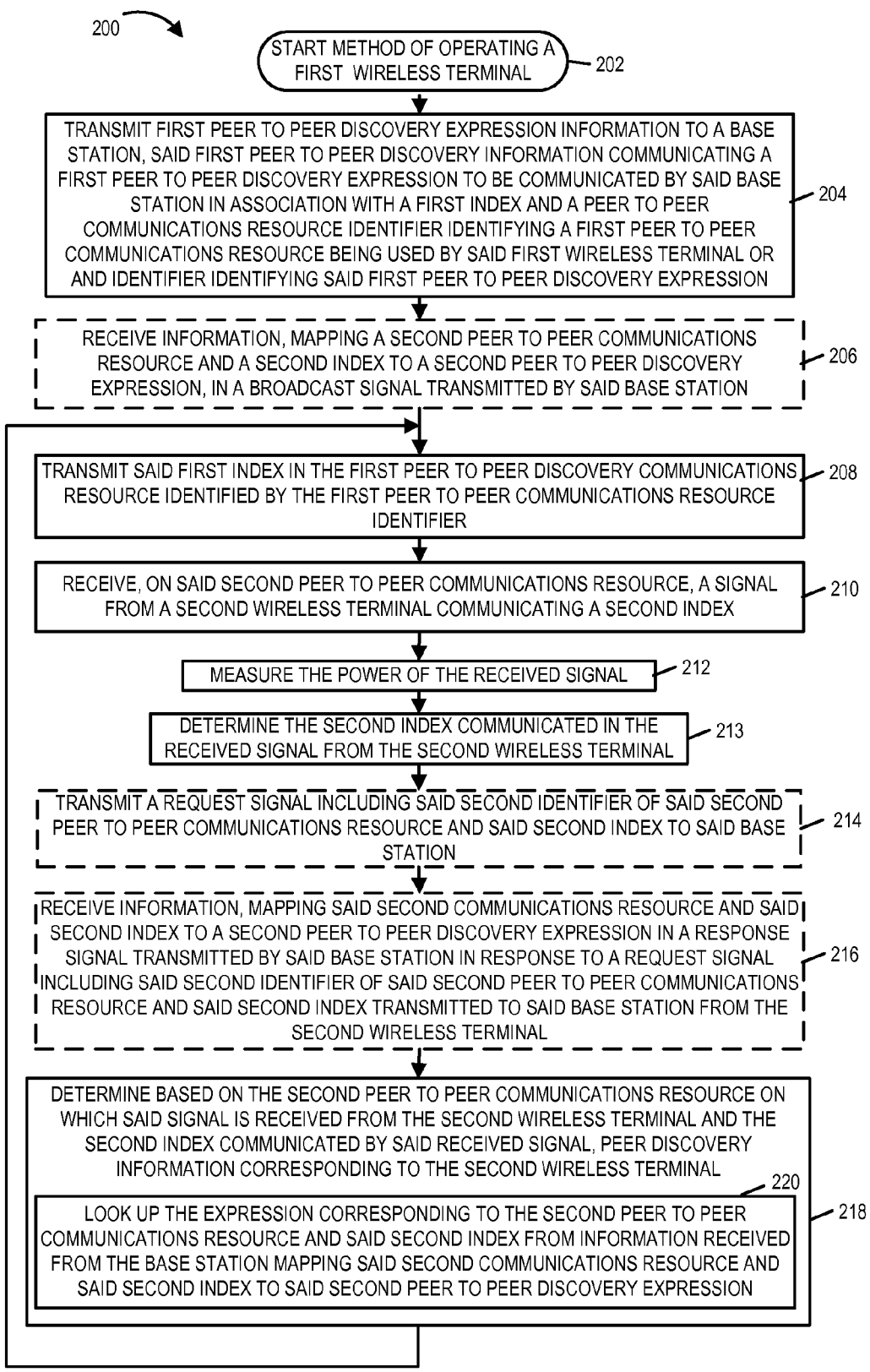
FIG. 2 is a flowchart of an exemplary method of operating a wireless terminal in accordance with various exemplary embodiments.

FIG. 2 is a flowchart 200 of an exemplary method of operating a first wireless terminal in accordance with various exemplary embodiments. Operation starts in step 202 where the first wireless terminal is powered on and initialized. Operation proceeds from start step 202 to step 204.

In step 204 the first wireless terminal transmits first peer to peer discovery expression information to a base station, said first peer to peer discovery expression information communicating a first peer to peer discovery expression to be communicated by said base station in association with a first index and a first peer to peer communications resource identifier identifying a first peer to peer discovery communications resource being used by said first wireless terminal or an identifier identifying said first peer to peer discovery expression. In some embodiments, operation proceeds from step 204 to step 206. In other embodiments, operation proceeds from step 204 to step 208. Returning to step 206, in step 206 the first wireless terminal receives information mapping a second peer to peer communications resource and a second index to a second peer to peer discovery expression, in a broadcast signal transmitted by said base station. In various embodiments, the broadcast information provides different peer discovery expressions for different indexes corresponding to said second peer to peer communications resource. Operation proceeds from step 206 to step 208.

In step 208 the first wireless terminal transmits said first index in the first peer to peer discovery communications resource identified by the first peer to peer communications resource identifier. In some embodiments, transmitting said first index in the first peer to peer communications resource includes transmitting said first index in a signal at a predetermined power level. In some embodiments, the first index is 3 bits or less. Operation proceeds from step 208 to step 210. In step 210 the first wireless terminal receives, on said second peer to peer communications resource, a signal from a second wireless terminal communicating a second index. Operation proceeds from step 210 to step 212. In step 212 the first wireless terminal measures the power of the received signal. In some embodiments, the received signal from the second wireless terminal was transmitted at a predetermined power. In some embodiments, the first wireless terminal estimates proximity information based on the measured power of the received signal, e.g., estimates the distance from the second wireless terminal to the first wireless terminal. In step 213, the first wireless terminal determines the second index communicated in the received signal from the second wireless communications device, e.g., the first wireless terminal performs a decoding operation and recovers the second index from the signal received from the second wireless terminal. In some embodiments, operation proceeds from step 213 to step 214; in other embodiments, operation proceeds from step 213 to step 218. Returning to step 214, in step 214 the first wireless terminal transmits a request signal including said second identifier of said second peer to peer communications resource and said second index to said base station. Operation proceeds from step 214 to step 216, in which the first wireless terminal receives information mapping said second communications resource and said second index to a second peer to peer discovery expression in a response signal transmitted by said base station in response to a request signal including said second identifier of said second peer to peer communications resource and said second index transmitted to said base station from the second wireless terminal. Operation proceeds from step 216 to step 218.

In step 218 the first wireless terminal determines based on the second peer to peer communications resource on which said signal is received from the second wireless terminal and the second index communicated by said received signal, peer discovery information corresponding to the second wireless terminal. Step 218 includes step 220 in which the first wireless terminal looks up the expression corresponding to the second peer to peer communication resource and said second index from information received from the base station mapping said second communications resource and said second index to said second peer to peer discovery expression. Operation proceeds from step 218 to step 208.

In some embodiments, the exemplary method further includes a step of deciding whether or not to perform a peer to peer communications operation based on one or more of determined proximity information, e.g., an estimated distance between the first and second wireless terminals, and the determined second peer to peer discovery expression. In some such embodiments, the peer to peer communications operation is one of a peer to peer connection operation, e.g., establish a peer to peer to peer connection with the second wireless terminal and a peer to peer traffic signaling operation, e.g., transmit a peer to peer traffic signal to the second wireless terminal or receive a peer to peer traffic signal from the second wireless terminal on a peer to peer traffic segment in a recurring peer to peer timing/frequency structure.

In various embodiments an index, e.g., the first index or second index, is represented by a relatively small number of information bits, e.g., 3 bits or less, and a peer to peer expression is represented by a relatively large number of information bits, e.g. 64 or more bits. In some embodiments, different peer to peer expressions are represented by different numbers of information bits, e.g., the first peer to peer discovery expression communicates 64 information bits, while the second peer to peer discovery expression communicates 512 information bits.

Figure 3:
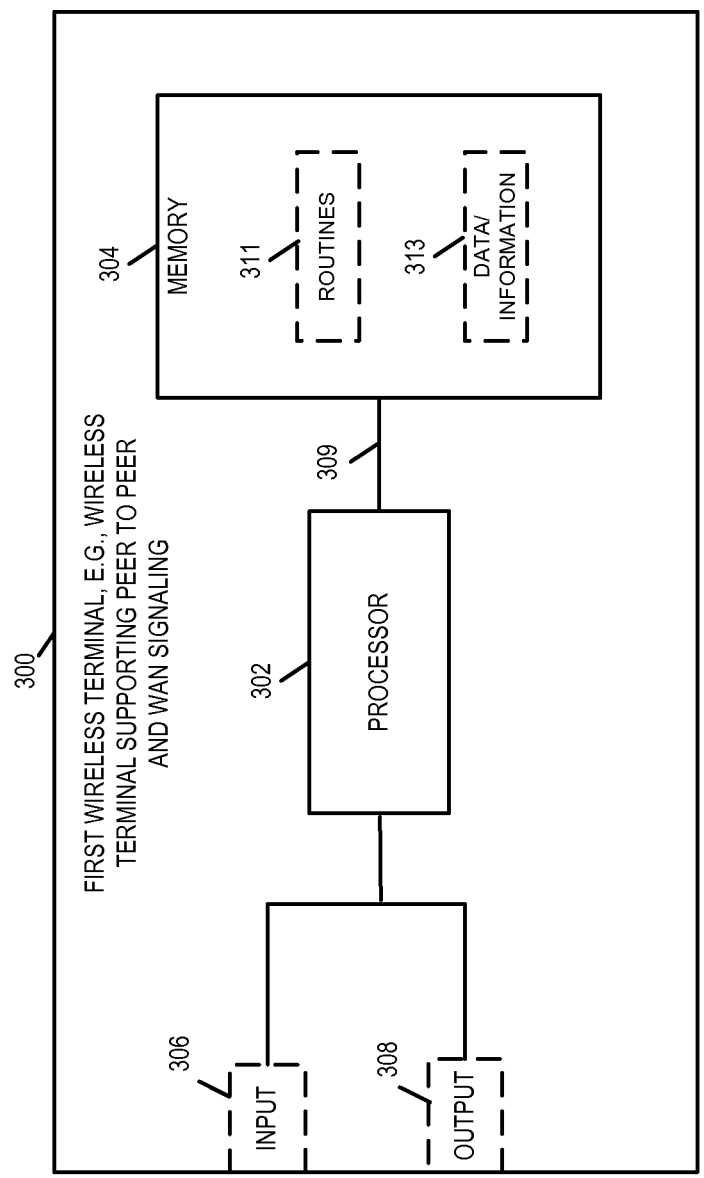
FIG. 3 is a drawing of an exemplary first wireless terminal, e.g., a mobile node supporting peer to peer communications and WAN communications, in accordance with an exemplary embodiment.

FIG. 3 is a drawing of an exemplary first wireless terminal 300, e.g., a mobile wireless terminal supporting peer to peer and WAN signaling, in accordance with an exemplary embodiment. Exemplary first wireless terminal 300 is, e.g., one of the wireless terminals of system 100 of FIG. 1 which support both peer to peer and WAN signaling. Exemplary first wireless terminal 300 may, and sometimes does, implement a method in accordance with flowchart 200 of FIG. 2.

First wireless terminal 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output. In some embodiments, memory 304 includes routines 311 and data/information 313.

In some embodiments, processor 302 is configured to: transmit first peer to peer discovery expression information to a base station, said first peer to peer discovery expression information communicating a first peer to peer discovery expression to be communicated by said base station in association with a first index and a first peer to peer communications resource identifier identifying a first peer to peer discovery communications resource being used by said first wireless terminal or an identifier identifying said first peer to peer discovery expression; and transmit said first index in the first peer to peer discovery communications resource identified by said first peer to peer communications resource identifier. In various embodiments processor 302 is configured to transmit said first index in a signal at a predetermined power level, as part of being configured to transmit said first index in the first peer to peer communications resource. In some embodiments, the first index is 3 bits or less.

In some embodiments, processor 302 is further configured to: receive, on a second peer to peer communications resource, a signal from a second wireless terminal communicating a second index; and measure the power of the received signal.

In various embodiments, processor is 302 further configured to: determine, based on the second peer to peer communications resource on which said signal is received from the second wireless terminal and the index communicated by said received signal, peer discovery information corresponding to said second wireless terminal.

In some such embodiments, processor 302 is configured to receive said information, mapping said second communications resource and said second index to a second peer to peer discovery expression in a broadcast signal transmitted by said base station. In various embodiments, the broadcast information provides different peer discovery expressions for different indexes corresponding to said second peer to peer communications resource.

In some embodiments, processor 302 is configured to: receive said information mapping said second communications resource and said index to a second peer to peer discovery expression in a response signal transmitted by said base station information in response to a request signal including said second identifier of said second peer to peer communications resource and said second index transmitted to said base station from said second wireless terminal. In various embodiments, processor 302 is configured to transmit the request signal prior to receiving the response signal.

In some embodiments, processor 302 is configured to look up the expression corresponding to said second peer to peer communications resource and said second index from information received from the base station mapping said second communications resource and said second index to said second peer to peer discovery expression, as part of being configured to determine, based on the resource on which said signal is received from the second wireless terminal and the index communicated by said received signal, peer discovery information corresponding to said second wireless terminal.

Figure 4:
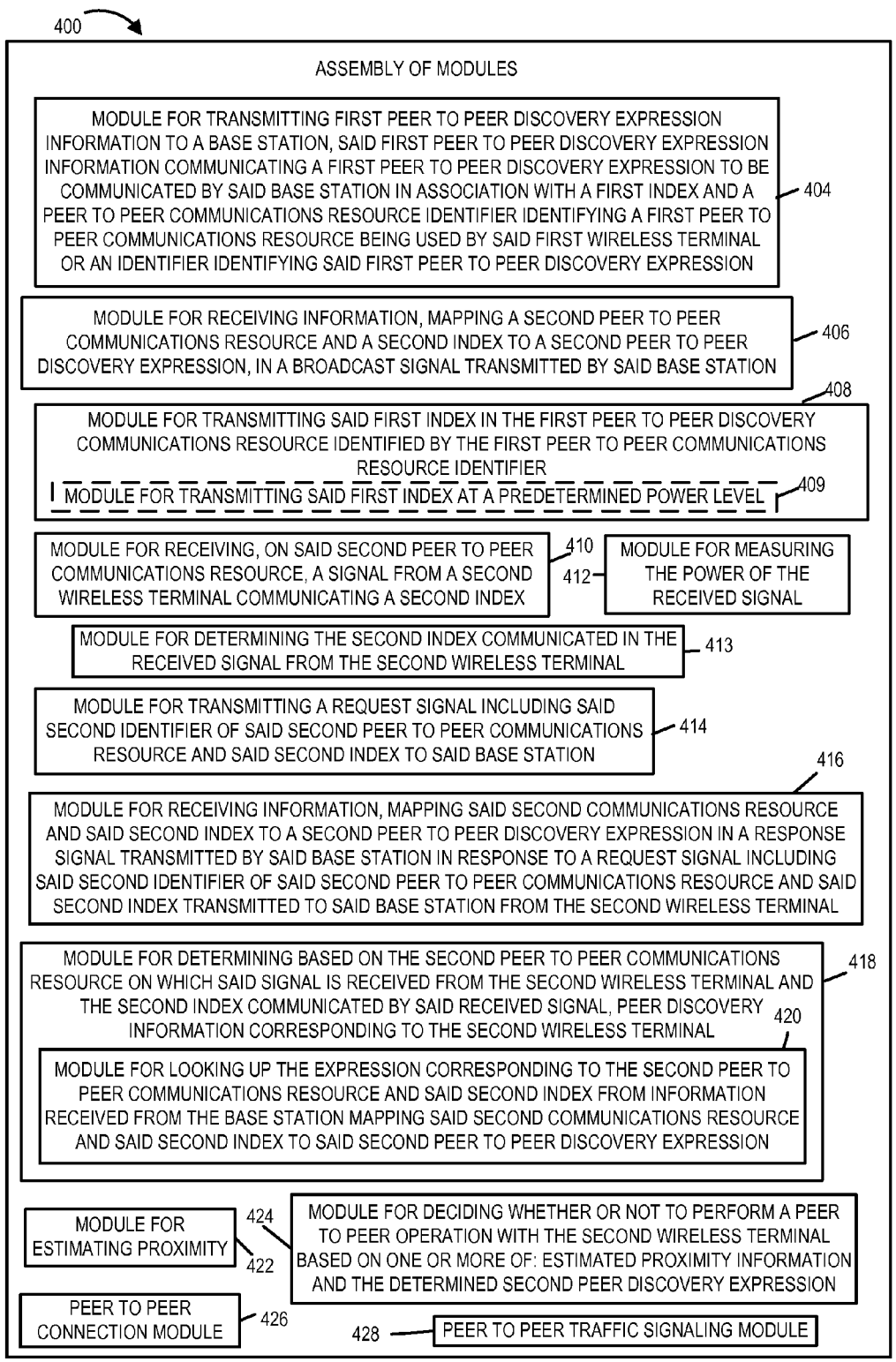
FIG. 4 is an assembly of modules which can, and in some embodiments is, used in the exemplary first wireless terminal illustrated in FIG. 3.

FIG. 4 is an assembly of modules 400 which can, and in some embodiments is, used in the exemplary first wireless terminal 300 illustrated in FIG. 3. The modules in the assembly 400 can be implemented in hardware within the processor 302 of FIG. 3, e.g., as individual circuits. Alternatively, the modules may be implemented in software and stored in the memory 304 of wireless terminal 300 shown in FIG. 3. In some such embodiments, the assembly of modules 400 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the wireless terminal 300 or elements therein such as the processor 302, to perform the functions of the corresponding steps illustrated and/or described in the method of flowchart 200 of FIG. 2.

Assembly of modules 400 includes a module for transmitting first peer to peer discovery expression information to a base station, said first peer to peer discovery expression information communicating a first peer to peer discovery expression to be communicated by said base station in association with a first index and a first peer to peer communications resource identifier identifying a first peer to peer discovery communications resource being used by said first wireless terminal or an identifier identifying said first peer to peer discovery expression 404, and a module for transmitting said first index in the first peer to peer discovery communications resource identified by the first peer to peer communications resource identifier 408. In various embodiments, module 408 transmits the first index in a signal at a predetermined power level. In some embodiments, module 408 includes a module for transmitting said first index at a predetermined power level 409. In some embodiments the first index is 3 bits or less.

Assembly of modules 400 further includes a module for receiving information, mapping a second peer to peer communications resource identified by the first peer to peer communications resource identifier and a second index to a second peer to peer discovery expression, in a broadcast signal transmitted by said base station 406. In various embodiments, broadcast information from the base station provides different peer discovery expressions for different indexes corresponding to the same peer to peer communications resource. Assembly of modules 400 further includes a module for receiving on said second peer to peer communications resource, a signal from a second wireless terminal communicating a second index 410, a module for measuring the power of the received signal 412, and a module for determining the second index communicated in the received signal from the second wireless terminal 413, e.g., a decoding module for recovering the second index. Assembly of modules 400 further includes a module for transmitting a request signal including said second identifier of said second peer to peer communications resource and said second index to said base station 414. Assembly of modules 400 further includes a module for receiving information mapping said second communications resource and said second index to a second peer to peer discovery expression in a response signal transmitted by said base station in response to a request signal including said second identifier of said second peer to peer communications resource and said second index transmitted to said base station from said second wireless terminal.

Assembly of modules 400 further includes a module for determining, based on the second peer to peer communications resource on which said signal is received from the second wireless terminal and the second identifier communicated by said received signal, peer discovery information corresponding to the second wireless terminal. Module 418 include a module for looking up the expression corresponding to the second peer to peer communications resource and said second index from the information received from the base station mapping said second communications resource and said second index to said second peer to peer discovery expression 420.

Assembly of modules 400 further includes a module for estimating proximity 422, e.g., a module for estimating the distance between the second and first wireless terminals based on the power measurement of the received signal from the second wireless terminal performed by module 412. Assembly of modules 400 further includes a module for deciding whether or not to perform a peer to peer operation with second wireless terminal based on one or more of: estimated proximity information, e.g., distance between the first and second wireless terminals, and the determined second peer discovery expression. Assembly of modules 400 further includes a peer to peer connection module 426. Module 426 establishes a peer to peer connection with the second wireless terminal and/or maintains an established peer to peer connection with the second wireless terminal. Assembly of modules 400 further includes a peer to peer traffic signaling module 428. Module 428 generates and transmits peer to peer traffic signals from the first wireless terminal to the second wireless terminal and receives and processes peer to peer traffic signals from the second wireless terminal, e.g., on a peer to peer traffic segment in a recurring peer to peer timing/frequency structure.

In some embodiments, the signal transmitted by module 408 is transmitted at a predetermined power level. In some embodiments, the signal transmitted by module 408 of the first wireless terminal is a peer discovery signal and the signal received by module 410 is also a peer discovery signal. In some embodiments, peer discovery signals are transmitted at a predetermined power level. In some embodiments, an index communicated in a peer discovery signal is 3 information bits or less.

In various embodiments, broadcast information from the base station may, and sometimes does, provides different peer discovery expressions for different indexes corresponding to the same peer to peer communications resource. In some embodiments, the first peer to peer communications resource, being used by the first wireless terminal, and the second peer to peer communications resource, being used by the second wireless terminal, are peer discovery resources in a recurring peer to peer timing frequency structure. In various embodiments, the same peer discovery communications resource may be, and sometime is, used concurrently by different wireless terminals which have been assigned different index values by the base station. In some embodiments, a peer discovery expression, e.g., first peer to peer discovery expression communicates 64 or more information bits. In some embodiments, different peer discovery expressions may communicate different numbers of information bits.

Various aspects and/or features of some embodiments will be further discussed. In some peer to peer communications networks, to enable peer to peer communication it is beneficial that mobiles or peers that are in vicinity of each other are able to discover each other. One way of enabling such peer discovery is to allow peers to transmit what are known as peer discovery signals periodically. In some embodiments a peer's presence is detected by other peers by listening and decoding the peer's peer discovery signal. This is an approach to peer discovery used in accordance with some peer to peer communications protocols. In some embodiments, a peer discovery channel in the peer to peer communications protocol coexists with WAN, and a WAN device, e.g., a WAN base station assists with peer discovery.

In some embodiments, a peer discovery signal is used for determining proximity information and for communicating an index used to identify a peer discovery expression. The measured received signal strength of a peer discovery signal received from a peer device is used as an indication of the proximity of the peer transmitting the peer discovery signal with regard to the peer receiving the peer discovery signal. So if the peer discovery received signal strength is high then the peer device which transmitted the peer discovery signal is likely to be in close proximity with respect to the device which received and measured the peer discovery signal. Conversely, if the peer discovery received signal strength is low then the peer device which transmitted the peer discovery signal is likely to be relatively far away from the peer device which received and measured the peer discovery signal.

Information bits communicated in a peer discovery signal communicate an index used in identifying a peer discovery expression. In some embodiments, the peer discovery expression being communicated is determined by a combination of the peer discovery resource used to communicate the peer discovery signal, the index value conveyed in the peer discovery signal, and mapping information associating the peer discovery expression with a particular peer discovery resource and a particular index communicated in the peer discovery signal. In some embodiments, the peer discovery expression tells a receiver of the peer discovery signal what kind of application and/or service the transmitter of the peer discovery signal is interested in. In some embodiments, the peer discovery resources are equal sizes, and each of the peers transmits the same number of bits, e.g., 3 information bits, on a peer discovery resource. In some embodiments, a peer discovery expression communicates a fixed number of information bits, e.g., 64 bits. In some embodiments, a peer discovery expression communicates one of a plurality of alternative fixed number of information bits, e.g., 64 bits, 128 bits, etc. In various embodiments a peer discovery expression and its association with a particular peer discovery resource and a particular index value communicated on the peer discovery resource is communicated from a WAN infrastructure node, e.g., a WAN base station, to the peer devices.

Figure 5:
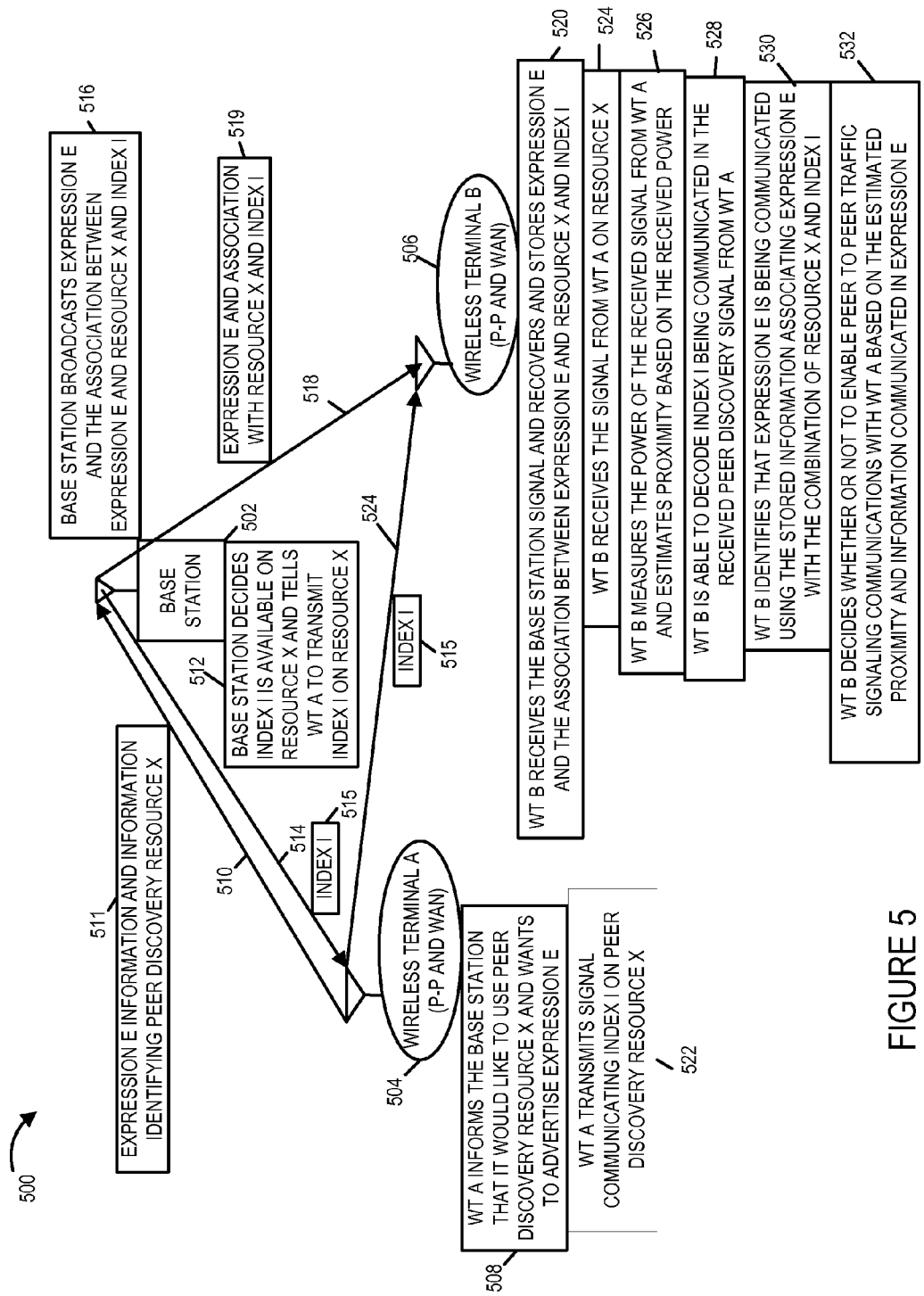
FIG. 5 illustrates an example of WAN assisted peer discovery in accordance with an exemplary embodiment.

FIG. 5 illustrates an example of WAN assisted peer discovery. In exemplary drawing 500 of FIG. 5 there is a WAN base station 502 and two exemplary peer devices supporting peer to peer and WAN signaling (wireless terminal A 504, wireless terminal B 506). Base station 502 is, e.g., WAN base station 102 of system 100 of FIG. 1, and WTs (504, 506) are, e.g., any of the wireless terminals supporting peer to peer and WAN signaling (110, 112, 114, 116, 118, . . . , 120) of system 100 of FIG. 1.

Consider that WT A 504 would like to advertise peer discovery expression E. WT A 504 monitors received energy on peer discovery resources, e.g., a set of peer discovery resources in a peer to peer recurring timing frequency structure. WT A 504 determines which peer discovery resource it would like to use based on the measured received energy of the monitored peer discovery resources. In some embodiments, WT A 504 selects the peer discovery resource with the minimum received energy thereby maximizing its range of discovery. Consider that WT A 504 selects peer discovery resource X.

WT A 504 informs the base station 502 that it would like to use peer discovery resource X and wants to advertise expression E, as indicated by block 508. WT A 504 informs the base station 502 by generating and transmitting uplink signal 510 communicating information 511 which includes expression E information and information identifying selected peer discovery resource X. Expression E information is the peer discovery expression E or an identifier identifying peer discovery expression E. Base station 502 receives signal 510 and recovers the information 511. Base station 502 decides that index I is available on resource X and tells WT A 504 to transmit index I on resource X, as indicated by block 512. Thus, base station 502 generates and transmits downlink signal 514 communicating index I 515.

Base station 502 broadcasts expression E and the association between expression E and resource X and index I, as indicated by block 516. Broadcast signal 518 transmitted from base station 502 conveys information 519 including expression E and its association with resource X and index I.

Wireless terminal B 506 receives the base station signal 518 and recovers and stores expression E and the association between expression E and resource X and index I, as indicated by block 520. Wireless terminal A 504 transmits peer discovery signal 524 communicating index I 515 on peer discovery resource X, as indicated by block 522.

Wireless terminal B 506 receives signal 524 from WT A 504 on resource X, as indicated by block 526. WT B 506 measures the received power of the received signal 524 from WT A 504 and estimates proximity based on the received power, as indicated by block 528. WT B 506 identifies that expression E is being communicated using the stored information associating expression E with the combination of resource X and index I, as indicated by block 530. WT B 506 decides whether or not to enable peer to peer traffic signaling communications with WT A 504 based on the estimated proximity and information communicated in expression E, as indicated by block 532.

Figure 6:
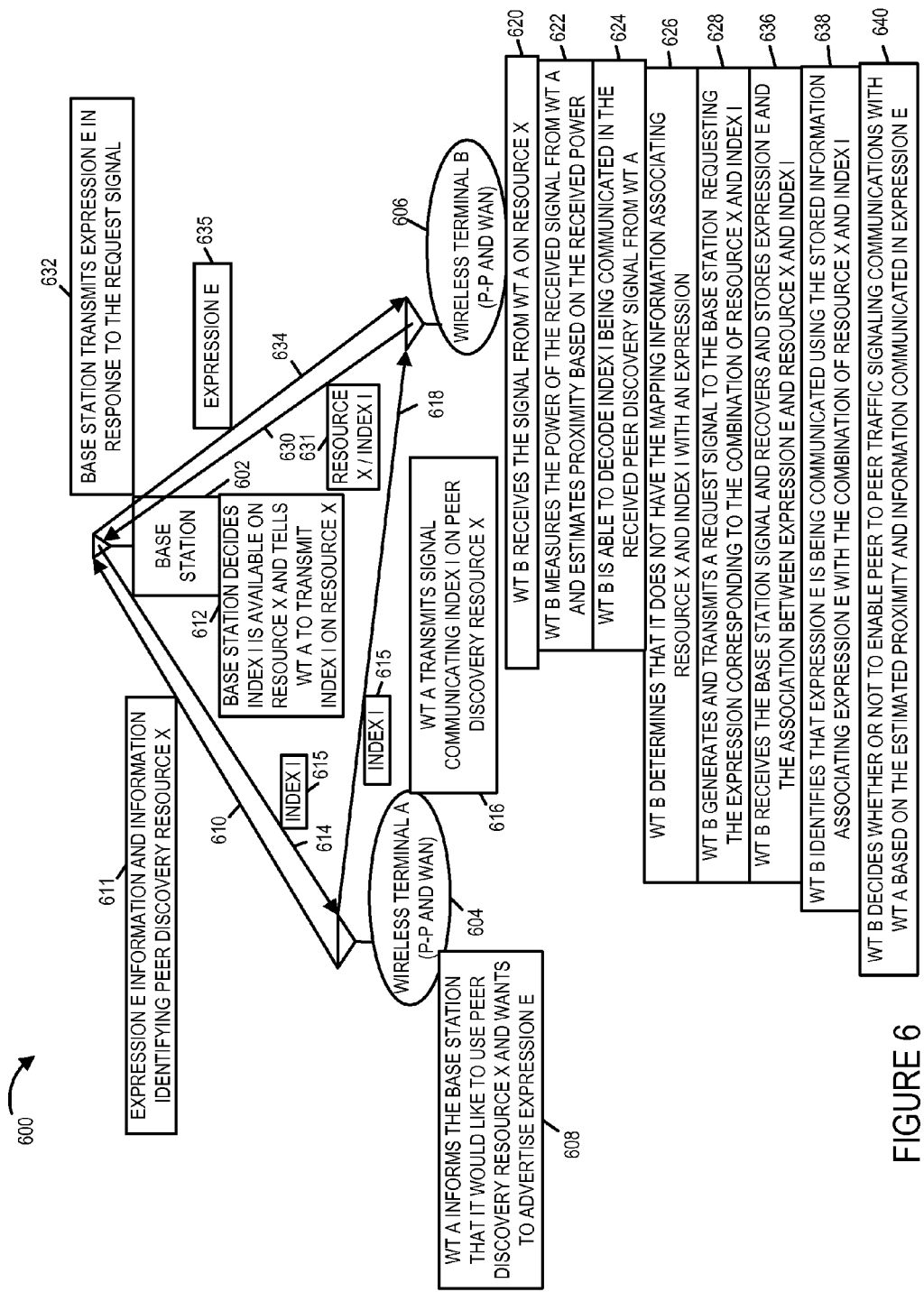
FIG. 6 illustrates another example of WAN assisted peer discovery in accordance with an exemplary embodiment.

FIG. 6 illustrates another example of WAN assisted peer discovery. In exemplary drawing 600 of FIG. 6 there is a WAN base station 602 and two exemplary peer devices supporting peer to peer and WAN signaling (wireless terminal A 604, wireless terminal B 606). Base station 602 is, e.g., WAN base station 102 of system 100 of FIG. 1, and WTs (604, 606) are, e.g., any of the wireless terminals supporting peer to peer and WAN signaling (110, 112, 114, 116, 118, . . . , 120) of system 100 of FIG. 1.

Consider that WT A 604 would like to advertise peer discovery expression E. WT A 604 monitors received energy on peer discovery resources, e.g., a set of peer discovery resources in a peer to peer recurring timing frequency structure. WT A 604 determines which peer discovery resource it would like to use based on the measured received energy of the monitored peer discovery resources. In some embodiments, WT A 604 selects the peer discovery resource with the minimum received energy thereby maximizing its range of discovery. Consider that WT A 604 selects peer discovery resource X.

WT A 604 informs the base station 602 that it would like to use peer discovery resource X and wants to advertise expression E, as indicated by block 608. WT A 604 informs the base station 602 by generating and transmitting uplink signal 610 communicating information 611 which includes expression E information and information identifying selected peer discovery resource X. Expression E information is the peer discovery expression E or an identifier identifying peer discovery expression E. Base station 602 receives signal 610 and recovers the information 611. Base station 602 decides that index I is available on resource X and tells WT A 604 to transmit index I on resource X, as indicated by block 612. Thus, base station 602 generates and transmits downlink signal 614 communicating index I 615.

Wireless terminal A 504 transmits peer discovery signal 618 communicating index I 615 on peer discovery resource X, as indicated by block 616. WT B 606 receives the peer discovery signal 618 on resource X, as indicted by block 620. WT B 606 measures the power of the received signal 618 from WT A 604 and estimates proximity based on the received power, as indicted by block 622. WT B 606 attempts to and is able to decode index I being communicated in the received peer discovery signal 618 from WT A 604 as indicated by block 624. WT B 608 determines that it does not have the mapping information associating resource X and index I with an expression, as indicated by block 626. WT B 606 generates and transmits a request signal 630 to the base station 602 requesting the expression corresponding to the combination of peer discovery resource X and index I, as indicated by block 628. Uplink request signal 630 conveying information 631 including information identifying resource X and index I. Base station 602 receives request signal 630, recovers information 631 and identifies that expression E is currently associated with the combination of resource X and index I. Base station 602 transmits downlink response signal 634 communicating expression E 635 in response to request signal 630, as indicated by block 632.

WT B 606 receives the base station response signal 634 and recovers and stores expression E 635 and the association between expression E and resource X and index I, as indicated by block 636. WT B 606 identifies that expression E is being communicated using the stored information associating expression E with the combination of resource X and index I, as indicated by block 638. WT B 604 decides whether or not to enable peer to peer traffic signaling communications with WT A 604 based on the estimated proximity and information communicated in expression E, as indicated by block 640.

There are several advantages of the previously described approaches of WAN assisted peer discovery, in which a WT transmits a peer discovery signal conveying an index on a peer discovery resource and a WAN base station transmits the peer discovery expression corresponding to the combination of resource and index. In some peer to peer networks without WAN peer discovery assistance, the information bit size of peer discovery expression communicated is limited, e.g., to 64 bits and has to be equal size for all peer discover signals. Thus peer discovery without WAN assistance can be restrictive. However, if the WAN forwards the expression then this limitation may be, and sometimes is removed. For example, in some embodiments using WAN assisted peer discovery the size of the peer discovery expression may be, and in some embodiments, is much larger than 64 bits, e.g., 128 bits, 256 bits, 512 bits, or more. In addition, in some WAN assisted peer discovery embodiments, different peer discovery expressions may be, and sometimes are different information bit sizes.

In various embodiments, a wireless terminal, supporting peer to peer and WAN signaling, transmits a peer discovery signal in a peer discovery resource communicating an index. In some embodiments, the index is represented by a relatively small number of information bits, e.g., 3 information bits. The index maps to a peer discovery expression communicated as a downlink signal by a WAN base station in the area in which the transmitting WT is located. The peer discovery resource may be, and sometimes is, reused by different wireless terminal at different locations in the system using the same peer discovery resource but transmitting different indices on the resource. In some embodiments, the transmitting wireless terminal selects the peer discovery resource and the WAN base station selects the index value that is to be communicated.

A wireless terminal, supporting peer to peer and WAN signaling, which detects an index communicated in a received peer discovery signal can measure the power of the received signal and determine, from information communicated by a WAN base station in the area, the peer discovery expression to which the received index corresponding to the particular transmission resource corresponds. In some embodiments, the base station also communicates device identification information and the receiving wireless terminal can determine the transmitting device ID from the combination of the index in the received peer discovery signal and the particular peer discovery resource. In some embodiments, the length of the peer discovery expression corresponding to an index for a particular transmission resource can be, and in some embodiments is, independent of the size of the transmission resource used to transmit the index. Furthermore, since the expression information is communicated by the base station which is normally not limited by battery power, the wireless terminal, supporting peer to peer and WAN signaling, need not be concerned with the amount of power or energy required to communicate the peer discovery expression to the other wireless terminals, supporting peer to peer and WAN signaling. In addition, since the base station controls the transmission of the peer discovery expression information to the wireless terminals, the base station can manage interference and the transmission of the peer discovery expressions to the wireless terminals, is not viewed as an interfering peer to peer transmission but rather is actually a base station downlink transmission.

A wireless terminal supporting peer to peer and WAN communications, e.g., device A 504 of FIG. 5 or device A 604 of FIG. 6, transmits a peer discovery signal on resource X, e.g., at a predetermined power level, and the signal communicate index I, wherein the index I is much smaller than the peer discovery expression E in length. For example, in one exemplary embodiment, the index I is represented by 3 information bits while the expression corresponding to index I and resource X is represented by 64 information bits. In various embodiments, device A selects the resource X and the expression E to be communicated and the base station selects the index I to be used.

Consider an example, peer A selects resource X and peer A informs the base station about the selected resource X and E. The base station decides whether an index is available on resource X in the local area. Consider that the base station decides that index I is available on resource X and notifies peer A to transmit index I on resource X. In some embodiments, the base station then broadcasts expression E and the information communicating that expression E is associated with resource X and index I to each of the devices in the area. Now if exemplary peer device B is able to decode index I on resource X it will know that E is the associated expression being communicated by peer A.

The index I can be, and in some embodiments, is much smaller than the expression E. For example if I is 3 bits long then for the same range compared to transmitting 72 bit expression one can save approximately 20 dB in transmit power. If I is n bit long then $2^n$ spatial reuse of the peer discovery channel is allowed in the broadcast area. Again for example if I is 3 bit long then 8 peers can reuse the same resource in the local area. For a peer discovery space of 4800, the number of devices supported can be 8*4800=38400.

The significantly small power needed for transmission of index bits and the exponential relationship between the number of bits transmitted and the number of peers that can reuse the resource allows us to retain the advantage of separating the two components of peer discovery, e.g., proximity information and expression information, while allowing more aggressive spatial reuse.

Figure 7:
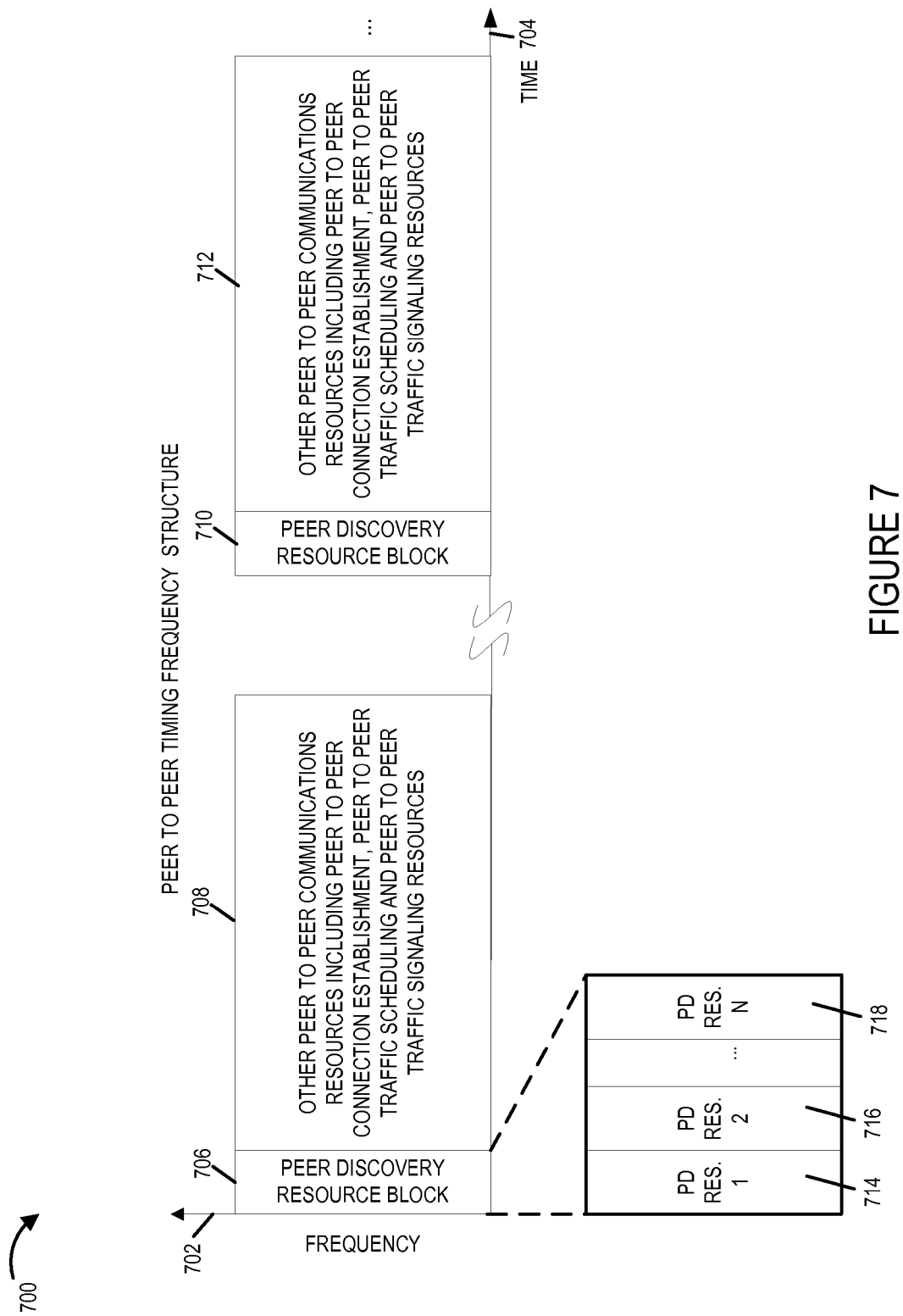
FIG. 7 illustrates an exemplary recurring peer to peer timing/frequency structure in accordance with an exemplary embodiment.

FIG. 7 illustrates an exemplary recurring peer to peer timing/frequency structure 700 in accordance with an exemplary embodiment. Vertical axis 702 represents frequency, e.g., OFDM tones, and horizontal axis 704 represents time, e.g., OFDM symbol transmission time intervals. The exemplary peer to peer timing/frequency structure 700 includes peer discovery resource blocks (706, 710) and other peer to peer communications resources (708, 712). A peer discovery resource block, e.g., peer discovery resource block 706) includes a plurality of different peer discovery resources (peer discovery resource 1 714, peer discovery resource 2 716, . . . , peer discovery resource N 718). In one exemplary embodiment N=4800. There is a predetermined mapping of individual peer discovery resources within a peer discovery resource block in accordance with the recurring timing/frequency structure. The other peer to peer communications resources, e.g., resources 708 include peer to peer connection establishment air link resources, peer to peer traffic scheduling air link resources and peer to peer traffic signaling air link resources, e.g., peer to peer traffic segments.

Figure 8:
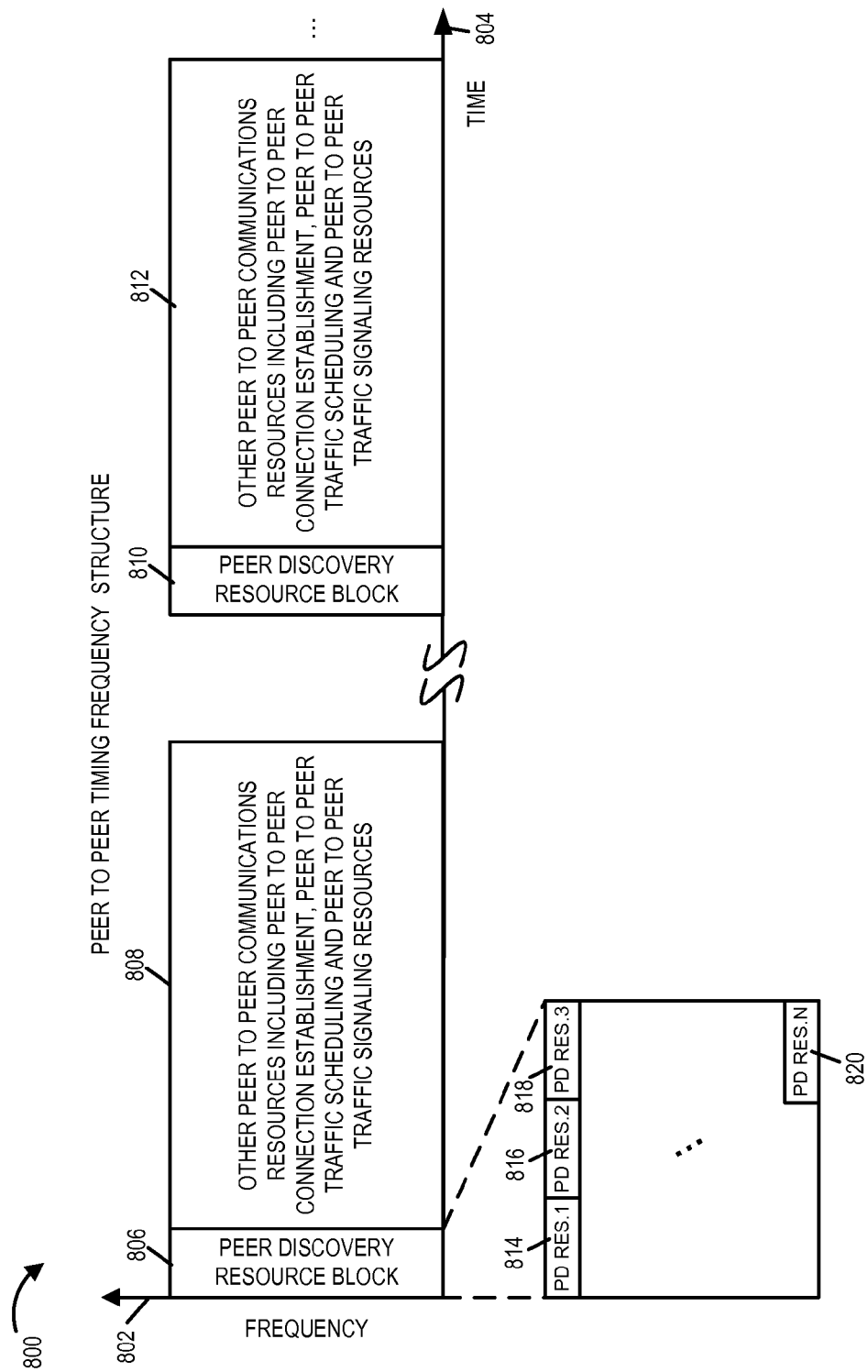
FIG. 8 illustrates an exemplary recurring peer to peer timing/frequency structure in accordance with an exemplary embodiment.

FIG. 8 illustrates an exemplary recurring peer to peer timing/frequency structure 800 in accordance with an exemplary embodiment. Vertical axis 802 represents frequency, e.g., OFDM tones, and horizontal axis 804 represents time, e.g., OFDM symbol transmission time intervals. The exemplary peer to peer timing/frequency structure 800 includes peer discovery resource blocks (806, 810) and other peer to peer communications resources (808, 812). A peer discovery resource block, e.g., peer discovery resource block 806) includes a plurality of different peer discovery resources (peer discovery resource 1 814, peer discovery resource 2 816, peer discovery resource 3 818, . . . , peer discovery resource N 818). In one exemplary embodiment N=4800. There is a predetermined mapping of individual peer discovery resources within a peer discovery resource block in accordance with the recurring timing/frequency structure. The other peer to peer communications resources, e.g., resources 808 include peer to peer connection establishment air link resources, peer to peer traffic scheduling air link resources and peer to peer traffic signaling air link resources, e.g., peer to peer traffic segments. In the example of FIG. 8, there are multiple peer discovery resources in the same time interval, e.g., peer discovery resource 3 818 and peer discovery resource N 820 occur during the same time interval in peer discovery resource block 806. In accordance with a feature of some embodiments, the position of an individual peer discovery resource is hopped within the peer discovery resource block over time, e.g., from one peer discovery resource block to the next peer discovery resource block, in accordance with a predetermined hopping scheme within the recurring frequency/timing structure. The hopping allows a device transmitting on a particular peer discovery resource to be able to receive on each of the other peer discovery resources over time.

Figure 9:
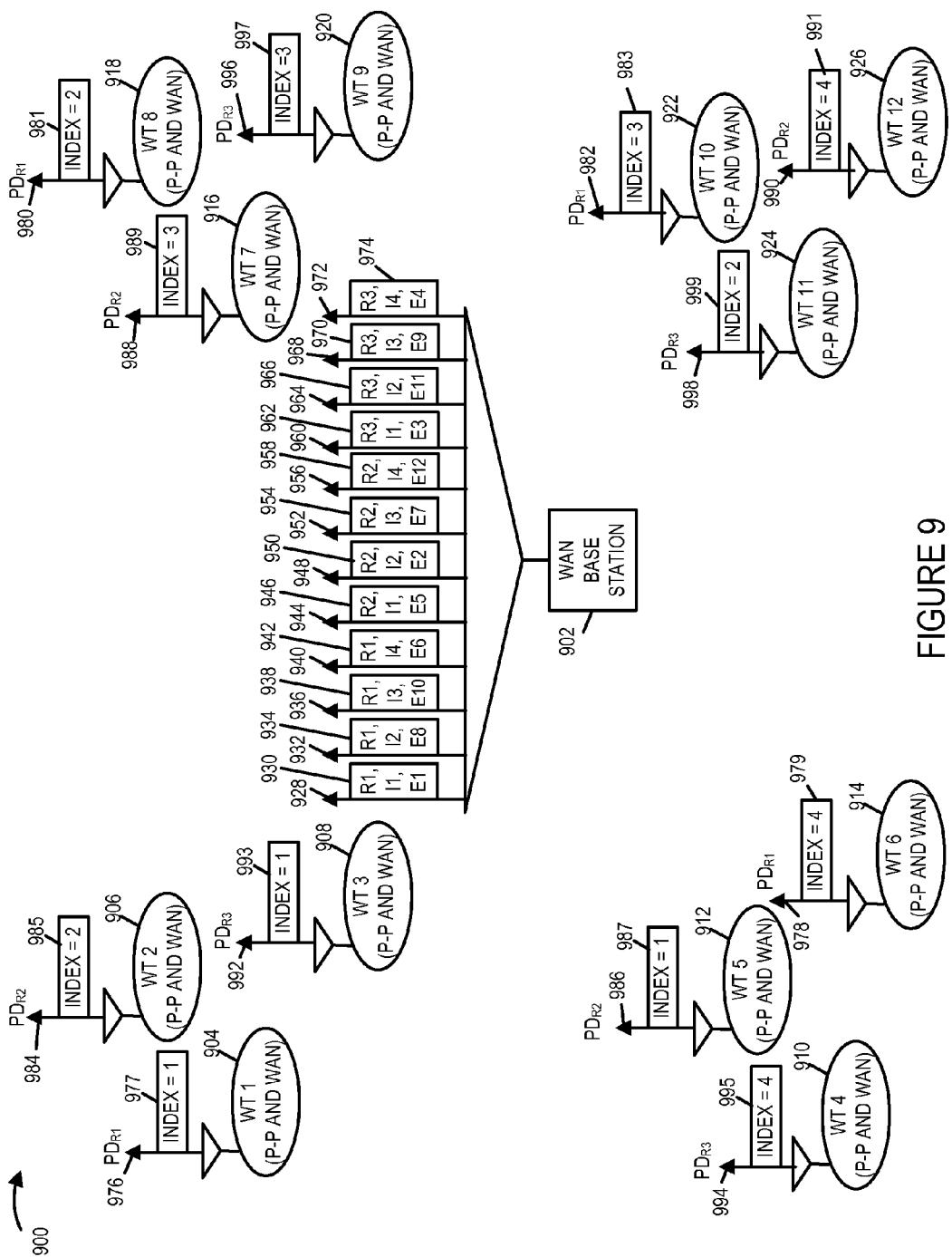
FIG. 9 illustrates an example, in which multiple wireless terminals located within the coverage area of a WAN base station are using the same peer discovery resource in accordance with an exemplary embodiment.

FIG. 9 illustrates an example, in which multiple wireless terminals located within the coverage area of a WAN base station are using the same peer discovery resource in accordance with an exemplary embodiment. FIG. 9 illustrates an exemplary system 900 including a WAN base station 902 and a plurality of wireless terminals supporting peer to peer and WAN signaling (WT 1 904, WT 2 906, WT 3 908, WT 4 910, WT 5 912, WT 6 914, WT 7 916, WT 8 918, WT 9 920, WT 10 922, WT 11 924, WT 12 926). Consider that each of the wireless terminals (904, 906, 908, 910, 912, 914, 916, 918, 920, 922, 924, 926) have previously entered the peer to peer network, measured existing peer discovery signal strengths, selected a peer discovery resource that it would like to use based on power measurements of the detected peer discovery signals, and communicated information to the base station 902 communicating or indentifying a peer discovery expression that it would like to advertise and information identifying the peer discovery resource that it intends to use. Further consider that the base station 902 has acquiesced in each case and assigned each wireless terminal a peer discovery index value to be communicated which is to be associated with the peer discovery resource and the peer discovery expression. WT 1 904 has selected peer discovery resource R1, has communicated that peer discovery expression E1 is to be communicated and has been assigned index=1. WT 2 906 has selected peer discovery resource R2, has communicated that peer discovery expression E2 is to be communicated and has been assigned index=2. WT 3 908 has selected peer discovery resource R3, has communicated that peer discovery expression E3 is to be communicated and has been assigned index=1. WT 4 910 has selected peer discovery resource R3, has communicated that peer discovery expression E4 is to be communicated and has been assigned index=4. WT 5 912 has selected peer discovery resource R2, has communicated that peer discovery expression E5 is to be communicated and has been assigned index=1. WT 6 914 has selected peer discovery resource R1, has communicated that peer discovery expression E6 is to be communicated and has been assigned index=4. WT 7 916 has selected peer discovery resource R2, has communicated that peer discovery expression E7 is to be communicated and has been assigned index=3. WT 8 918 has selected peer discovery resource R1, has communicated that peer discovery expression E8 is to be communicated and has been assigned index=2. WT 9 920 has selected peer discovery resource R3, has communicated that peer discovery expression E9 is to be communicated and has been assigned index=3. WT 10 922 has selected peer discovery resource R1, has communicated that peer discovery expression E10 is to be communicated and has been assigned index=3. WT 11 924 has selected peer discovery resource R3, has communicated that peer discovery expression E11 is to be communicated and has been assigned index=2. WT 12 926 has selected peer discovery resource R2, has communicated that peer discovery expression E12 is to be communicated and has been assigned index=4.

The WAN base station 902 transmits each of the peer discovery expressions and information identifying the associated peer discovery resource and index communicated in the peer discovery resource. Base station 902 transmits signal 928 communicating information 930 including peer discovery expression E1 and information associating expression E1 with peer discovery resource R1 and index=1. Base station 902 transmits signal 932 communicating information 934 including peer discovery expression E8 and information associating expression E8 with peer discovery resource R1 and index=2. Base station 902 transmits signal 936 communicating information 938 including peer discovery expression E10 and information associating expression E10 with peer discovery resource R1 and index=3. Base station 902 transmits signal 940 communicating information 942 including peer discovery expression E6 and information associating expression E6 with peer discovery resource R1 and index=4.

Base station 902 transmits signal 944 communicating information 946 including peer discovery expression E5 and information associating expression E5 with peer discovery resource R2 and index=1. Base station 902 transmits signal 948 communicating information 950 including peer discovery expression E2 and information associating expression E2 with peer discovery resource R2 and index=2. Base station 902 transmits signal 952 communicating information 954 including peer discovery expression E7 and information associating expression E7 with peer discovery resource R2 and index=3. Base station 902 transmits signal 956 communicating information 958 including peer discovery expression E12 and information associating expression E12 with peer discovery resource R2 and index=4.

Base station 902 transmits signal 960 communicating information 962 including peer discovery expression E3 and information associating expression E3 with peer discovery resource R3 and index=1. Base station 902 transmits signal 964 communicating information 966 including peer discovery expression E11 and information associating expression E11 with peer discovery resource R3 and index=2. Base station 902 transmits signal 968 communicating information 970 including peer discovery expression E9 and information associating expression E9 with peer discovery resource R3 and index=3. Base station 902 transmits signal 972 communicating information 974 including peer discovery expression E4 and information associating expression E4 with peer discovery resource R3 and index=4. The base station signals (928, 932, 936, 940, 944, 948, 952, 956, 960, 964, 968, 972) are transmitted as broadcast signals, e.g., at a fixed power level intended to be able to reach each WT in its WAN coverage area and in accordance with a WAN downlink broadcast schedule and/or in response to requests from wireless terminals, e.g., as downlink WAN signals at a downlink transmission power level intended to be able to reach the WT which is transmitted the request.

WT 1 904 transmits peer discovery signal 976 on peer discovery resource R1 communicating information 977 including index=1. WT 6 914 transmits peer discovery signal 978 on peer discovery resource R1 communicating information 979 including index=4. WT 8 918 transmits peer discovery signal 980 on peer discovery resource R1 communicating information 981 including index=2. WT 10 922 transmits peer discovery signal 982 on peer discovery resource R1 communicating information 983 including index=3.

WT 2 906 transmits peer discovery signal 984 on peer discovery resource R2 communicating information 985 including index=2. WT 5 912 transmits peer discovery signal 986 on peer discovery resource R2 communicating information 987 including index=1. WT 7 916 transmits peer discovery signal 988 on peer discovery resource R2 communicating information 989 including index=3. WT 12 926 transmits peer discovery signal 990 on peer discovery resource R2 communicating information 991 including index=4.

WT 3 908 transmits peer discovery signal 992 on peer discovery resource R3 communicating information 993 including index=1. WT 4 910 transmits peer discovery signal 994 on peer discovery resource R3 communicating information 995 including index=4. WT 9 920 transmits peer discovery signal 996 on peer discovery resource R3 communicating information 997 including index=3. WT 11 924 transmits peer discovery signal 998 on peer discovery resource R3 communicating information 999 including index=2.

A wireless terminal monitors peer discovery resources corresponding to other resources than the resource that is transmitting on. If the wireless terminal detects a peer discovery signal on a monitored resource and is able to decode the index being communicated, the wireless terminal can, and sometimes does, determine the peer discovery expression being communicated based on the mapping between the expression and the combination of peer discovery resource and index value conveyed in the peer discovery resource. The mapping information may have been previously stored in the wireless terminal, e.g., from a previously received downlink signal from the base station or the mapping information may be retrieved from the base station via a request and received response signal or if the expression/resource/index is being broadcast the wireless terminal may wait until it detects the next broadcast signal communicating the information, if it does not already have the expression and mapping information already stored in its memory.

A wireless terminal receiving a peer discovery signal may, and sometimes does estimate proximity to the transmitting peer wireless terminal based on the received power level of the detected peer discovery signal. In some embodiments, peer discovery signals are transmitted at a predetermined power level. In some embodiments, if a wireless terminal is able to decode an index communicated in a received peer discovery signal and recover the corresponding peer discovery expression the wireless terminal makes a decision as to whether or not to establish a peer to peer connection with the transmitting wireless terminal based on estimated proximity and the information being advertised by the transmitting wireless terminal.

In one embodiment, the index is represented by two information bits, e.g., a communicated index in a peer discovery signal is one of: 1, 2, 3 and 4. In some embodiments, the index is represented by three information bits, e.g., a communicated index in a peer discovery signal is one of: 1, 2, 3, 4, 5, 6, 7 and 8. In some embodiments, a peer discovery expression, e.g., expression E1, has a size of 64 information bits. In some embodiments, a peer discovery expression is 64 information bits or more in size. In some embodiments, different peer discovery expressions may be, and sometimes are different sizes. For example, in one embodiment peer discovery expression E1 has a size of 64 information bits, peer discovery expression E2 has a size of 512 information bits and peer discovery expression E3 has a sized of 128 information bits.

In various embodiments, the predetermined fixed transmission power level of a peer discovery is intentionally selected such that a transmitted peer discovery signal is intended to have its index decodable in an area which is a small fraction of the area covered by the WAN base station, e.g., 25% or less of the area covered by the base station.

Figure 10:
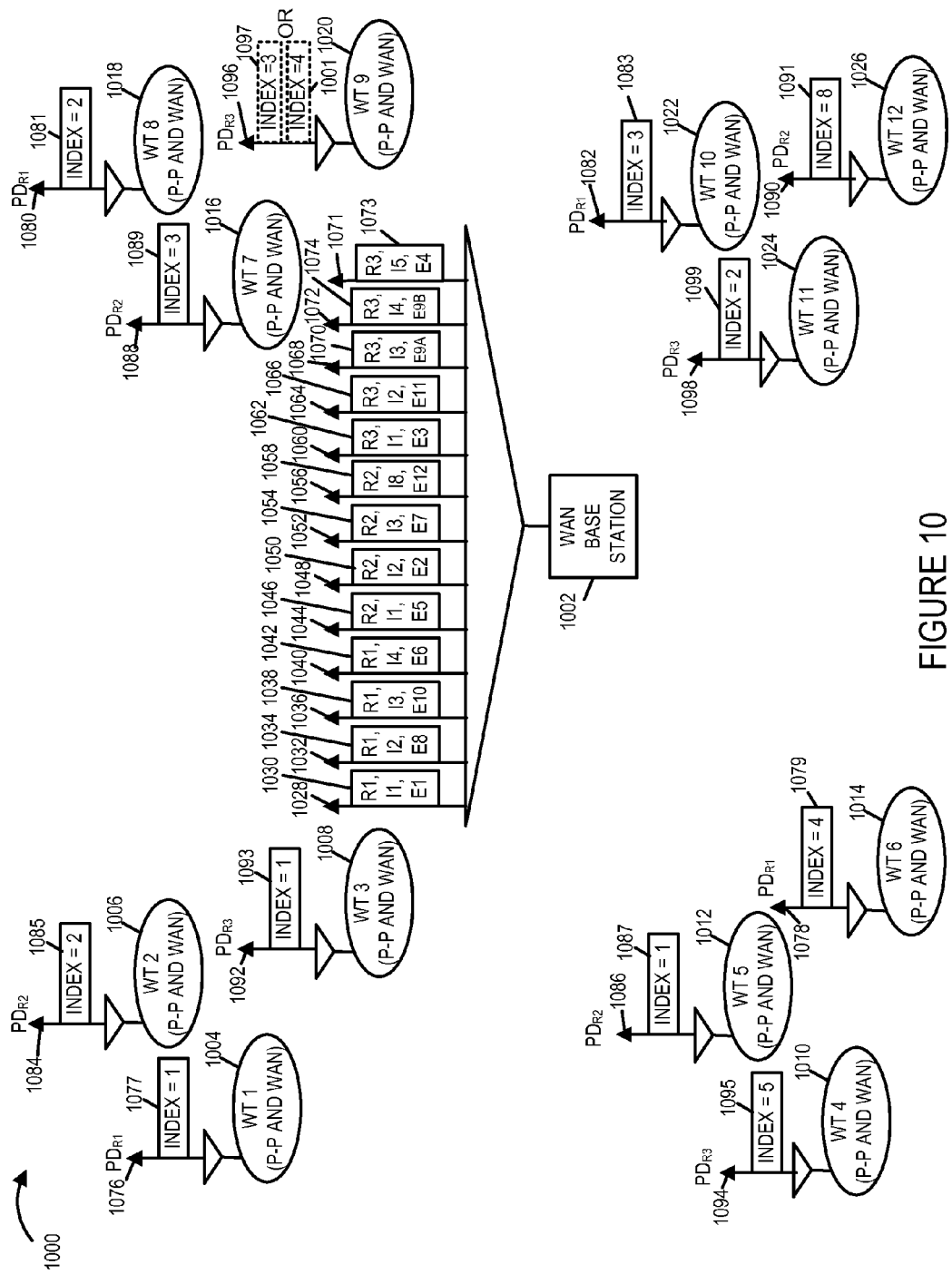
FIG. 10 illustrates another example, in which multiple wireless terminals located within the coverage area of a WAN base station are using the same peer discovery resource in accordance with an exemplary embodiment.

FIG. 10 illustrates an example, in which multiple wireless terminals located within the coverage area of a WAN base station are using the same peer discovery resource in accordance with an exemplary embodiment. In the example of FIG. 10, a wireless terminal may, and sometimes does, request and acquire multiple index values corresponding to different peer discovery expressions and corresponding to the same peer discovery resource.

FIG. 10 illustrates an exemplary system 1000 including a WAN base station 1002 and a plurality of wireless terminals supporting peer to peer and WAN signaling (WT 1 1004, WT 2 1006, WT 3 1008, WT 4 1010, WT 5 1012, WT 6 1014, WT 7 1016, WT 8 1018, WT 9 1020, WT 10 1022, WT 11 1024, WT 12 1026). Consider that each of the wireless terminals (1004, 1006, 1008, 1010, 1012, 1014, 1016, 1018, 1020, 1022, 1024, 1026) have previously entered the peer to peer network, measured existing peer discovery signal strengths, selected a peer discovery resource that it would like to use based on power measurements of the detected peer discovery signals, and communicated information to the base station 1002 communicating or indentifying one or more peer discovery expression that it would like to advertise and information identifying the peer discovery resource that it intends to use. Further consider that the base station 1002 has acquiesced in each case and assigned each wireless terminal a peer discovery index value to be communicated which is to be associated with a combination of a peer discovery resource and a peer discovery expression. WT 1 1004 has selected peer discovery resource R1, has communicated that peer discovery expression E1 is to be communicated and has been assigned index=1. WT 2 1006 has selected peer discovery resource R2, has communicated that peer discovery expression E2 is to be communicated and has been assigned index=2. WT 3 1008 has selected peer discovery resource R3, has communicated that peer discovery expression E3 is to be communicated and has been assigned index=1. WT 4 1010 has selected peer discovery resource R3, has communicated that peer discovery expression E4 is to be communicated and has been assigned index=5. WT 5 1012 has selected peer discovery resource R2, has communicated that peer discovery expression E5 is to be communicated and has been assigned index=1. WT 6 1014 has selected peer discovery resource R1, has communicated that peer discovery expression E6 is to be communicated and has been assigned index=4. WT 7 1016 has selected peer discovery resource R2, has communicated that peer discovery expression E7 is to be communicated and has been assigned index=3. WT 8 1018 has selected peer discovery resource R1, has communicated that peer discovery expression E8 is to be communicated and has been assigned index=2. WT 9 1020 has selected peer discovery resource R3, has communicated that peer discovery expression E9A and peer discovery expression E9B are to be communicated and has been assigned index=3 to correspond to peer discovery expression E9A and index=4 to correspond to index=4. WT 10 1022 has selected peer discovery resource R1, has communicated that peer discovery expression E10 is to be communicated and has been assigned index=3. WT 11 1024 has selected peer discovery resource R3, has communicated that peer discovery expression E11 is to be communicated and has been assigned index=2. WT 12 1026 has selected peer discovery resource R2, has communicated that peer discovery expression E12 is to be communicated and has been assigned index=8.

The WAN base station 1002 transmits each of the peer discovery expressions and information identifying the associated peer discovery resource and index communicated in the peer discovery resource. Base station 1002 transmits signal 1028 communicating information 1030 including peer discovery expression E1 and information associating expression E1 with peer discovery resource R1 and index=1. Base station 1002 transmits signal 1032 communicating information 1034 including peer discovery expression E8 and information associating expression E8 with peer discovery resource R1 and index=2. Base station 1002 transmits signal 1036 communicating information 1038 including peer discovery expression E10 and information associating expression E10 with peer discovery resource R1 and index=3. Base station 1002 transmits signal 1040 communicating information 1042 including peer discovery expression E6 and information associating expression E6 with peer discovery resource R1 and index=4.

Base station 1002 transmits signal 1044 communicating information 1046 including peer discovery expression E5 and information associating expression E5 with peer discovery resource R2 and index=1. Base station 1002 transmits signal 1048 communicating information 1050 including peer discovery expression E2 and information associating expression E2 with peer discovery resource R2 and index=2. Base station 1002 transmits signal 1052 communicating information 1054 including peer discovery expression E7 and information associating expression E7 with peer discovery resource R2 and index=3. Base station 1002 transmits signal 1056 communicating information 1058 including peer discovery expression E12 and information associating expression E12 with peer discovery resource R2 and index=8.

Base station 1002 transmits signal 1060 communicating information 1062 including peer discovery expression E3 and information associating expression E3 with peer discovery resource R3 and index=1. Base station 1002 transmits signal 1064 communicating information 1066 including peer discovery expression E11 and information associating expression E11 with peer discovery resource R3 and index=2. Base station 1002 transmits signal 1068 communicating information 1070 including peer discovery expression E9A and information associating expression E9A with peer discovery resource R3 and index=3. Base station 1002 transmits signal 1072 communicating information 1074 including peer discovery expression E9B and information associating expression E9B with peer discovery resource R3 and index=4. Base station 1002 transmits signal 1071 communicating information 1073 including peer discovery expression E4 and information associating expression E4 with peer discovery resource R3 and index=4.

The base station signals (1028, 1032, 1036, 1040, 1044, 1048, 1052, 1056, 1060, 1064, 1068, 1072, 1071) are transmitted as broadcast signals, e.g., at a fixed power level intended to be able to reach each WT in its WAN coverage area and in accordance with a WAN downlink broadcast schedule and/or in response to requests from wireless terminals, e.g., as downlink WAN signals at a downlink transmission power level intended to be able to reach the WT which transmitted the request.

WT 1 1004 transmits peer discovery signal 1076 on peer discovery resource R1 communicating information 1077 including index=1. WT 6 1014 transmits peer discovery signal 1078 on peer discovery resource R1 communicating information 1079 including index=4. WT 8 1018 transmits peer discovery signal 1080 on peer discovery resource R1 communicating information 1081 including index=2. WT 10 1022 transmits peer discovery signal 1082 on peer discovery resource R1 communicating information 1083 including index=3.

WT 2 1006 transmits peer discovery signal 1084 on peer discovery resource R2 communicating information 1085 including index=2. WT 5 1012 transmits peer discovery signal 1086 on peer discovery resource R2 communicating information 1087 including index=1. WT 7 1016 transmits peer discovery signal 1088 on peer discovery resource R2 communicating information 1089 including index=3. WT 12

1026 transmits peer discovery signal 1090 on peer discovery resource R2 communicating information 1091 including index=8.

WT 3 1008 transmits peer discovery signal 1092 on peer discovery resource R3 communicating information 1093 including index=1. WT 4 1010 transmits peer discovery signal 1094 on peer discovery resource R3 communicating information 1095 including index=5. WT 9 1020 transmits peer discovery signal 1096 on peer discovery resource R3 communicating information 1097 including index=3 or alternatively WT 9 1020 transmits peer discovery signal 1096 on peer discovery resource R3 communicating information 1001 including index=4, depending on the particular peer discovery expression that WT 9 1020 desires to advertise at a particular peer discovery transmission opportunity. In some embodiments, the WT 9 decides which peer discovery expression to advertise as a function of: time of day, day of week, location, wireless terminal congestion level, proximity to a particular wireless terminal of interest, and/or proximity a member of a group of interest. WT 11 1024 transmits peer discovery signal 1098 on peer discovery resource R3 communicating information 1099 including index=2.

A wireless terminal monitors peer discovery resources corresponding to other resources than the resource that is transmitting on. If the wireless terminal detects a peer discovery signal on a monitored resource and is able to decode the index being communicated, the wireless terminal can, and sometimes does, determine the peer discovery expression being communicated based on the mapping between the expression and the combination of peer discovery resource and index value conveyed in the peer discovery resource. The mapping information may have been previously stored in the wireless terminal, e.g., from a previously received downlink signal from the base station or the mapping information may be retrieved from the base station via a request and received response signal or if the expression/resource/index is being broadcast the wireless terminal may wait until it detects the next broadcast signal communicating the information, if it does not already have the expression and mapping information already stored in its memory.

A wireless terminal receiving a peer discovery signal may, and sometimes does estimate proximity to the transmitting peer wireless terminal based on the received power level of the detected peer discovery signal. In some embodiments, peer discovery signals are transmitted at a predetermined power level. In some embodiments, if a wireless terminal is able to decode an index communicated in a received peer discovery signal and recover the corresponding peer discovery expression the wireless terminal makes a decision as to whether or not to establish a peer to peer connection with the transmitting wireless terminal based on estimated proximity and the information being advertised by the transmitting wireless terminal.

In some embodiments, the index is represented by three information bits, e.g., a communicated index in a peer discovery signal is one of: 1, 2, 3, 4, 5, 6, 7 and 8, which may be represented by bit patterns 000, 001, 010, 011, 100, 101, 110, and 111. In some embodiments, a peer discovery expression, e.g., expression E1, has a size of 64 information bits. In some embodiments, a peer discovery expression is 64 information bits or more in size. In some embodiments, different peer discovery expressions may be, and sometimes are different sizes. For example, in one embodiment peer discovery expression E1 has a size of 64 information bits, peer discovery expression E2 has a size of 512 information bits and peer discovery expression E3 has a sized of 128 information bits.

In various embodiments, the predetermined fixed transmission power level of a peer discovery is intentionally selected such that a transmitted peer discovery signal is intended to have its index decodable in an area which is a small fraction of the area covered by the WAN base station, e.g., 25% or less of the area covered by the base station.

Figure 11A:
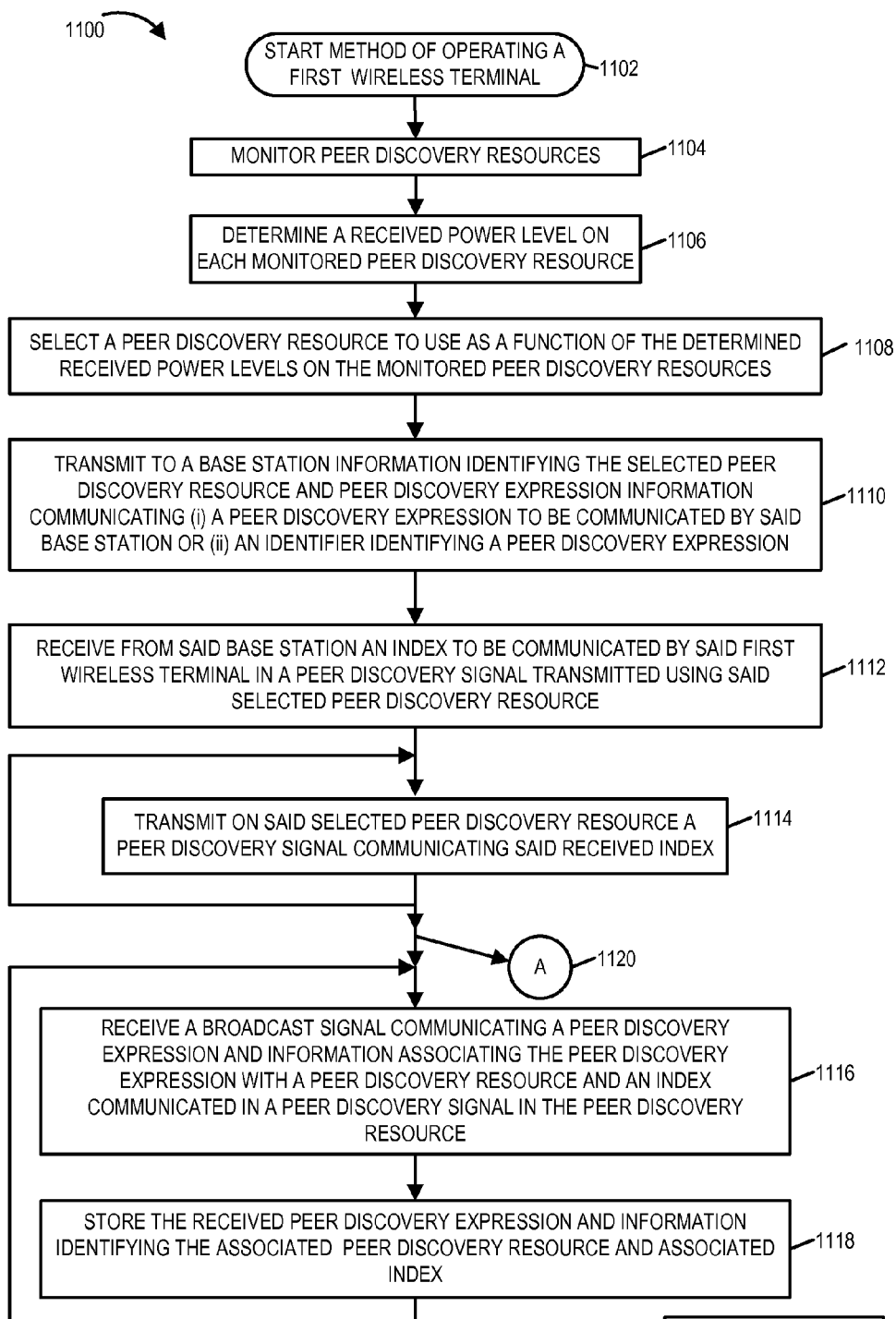
FIG. 11A is a first part of a flowchart of an exemplary method of operating a wireless terminal in accordance with an exemplary embodiment.
Figure 11B:
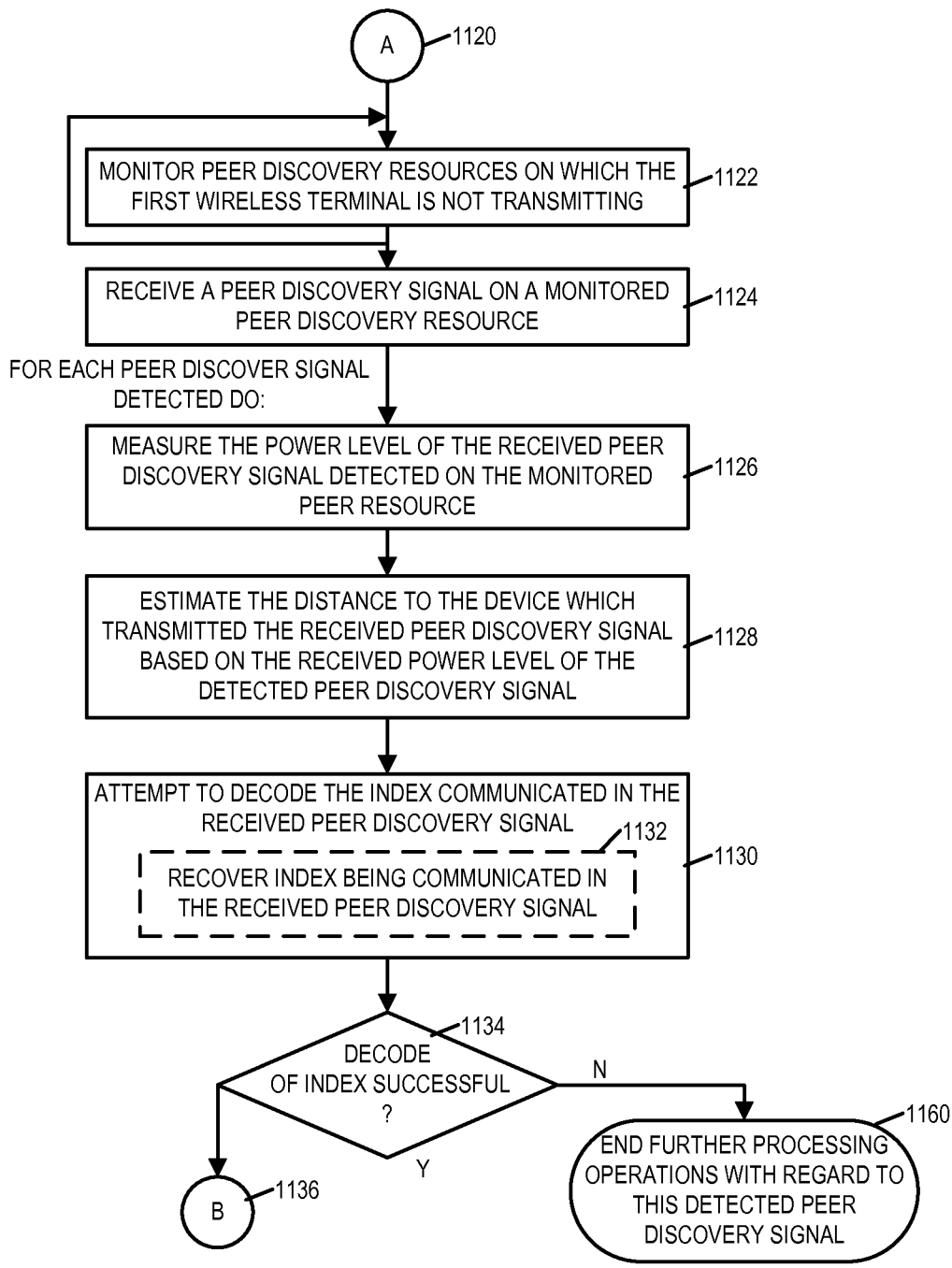
FIG. 11B is a second part of a flowchart of an exemplary method of operating a wireless terminal in accordance with an exemplary embodiment.
Figure 11C:
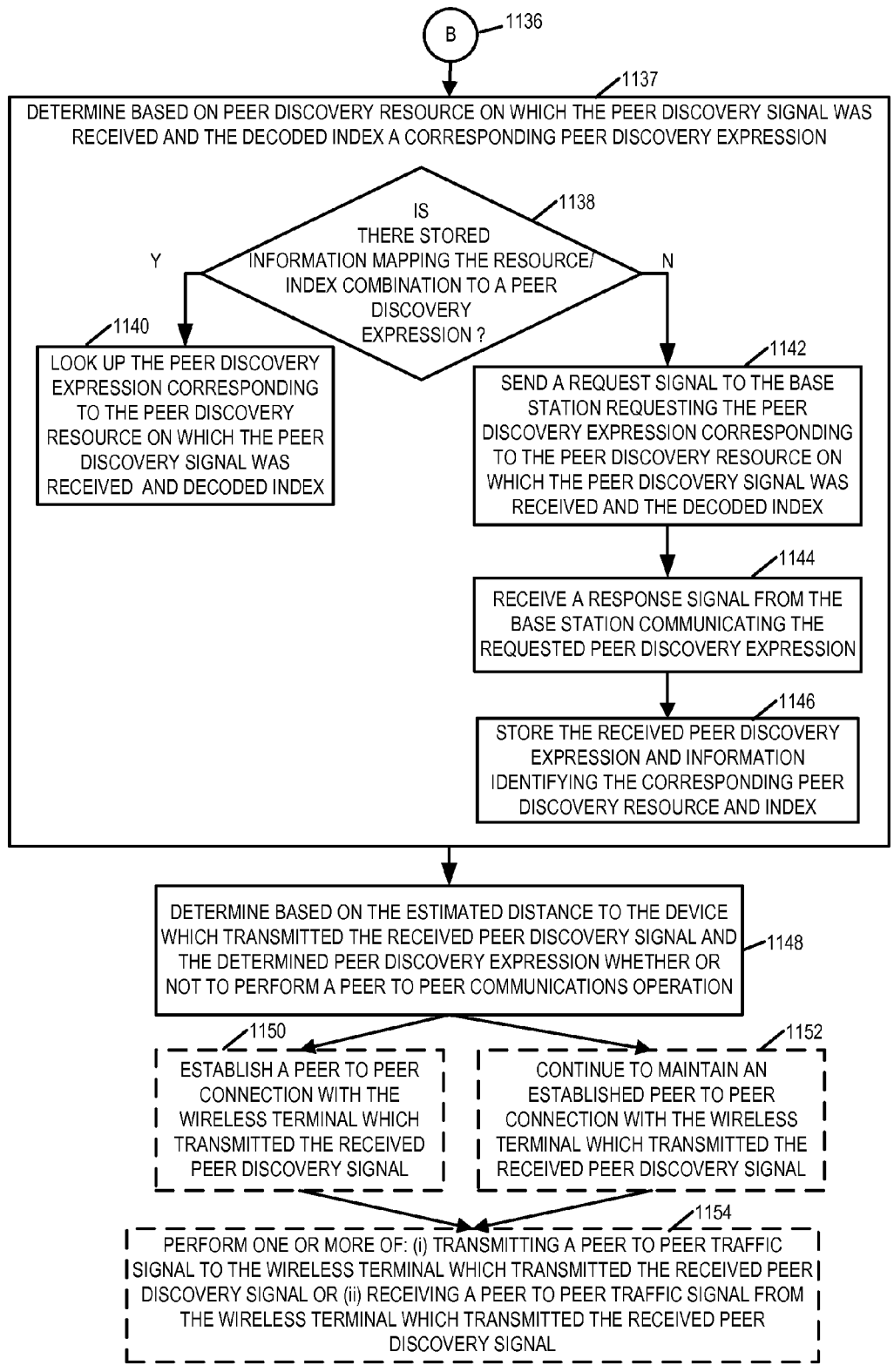
FIG. 11C is a third part of a flowchart of an exemplary method of operating a wireless terminal in accordance with an exemplary embodiment.

FIG. 11, comprising the combination of FIG. 11, FIG. 11B and FIG. 11C, is a flowchart 1100 of an exemplary method of operating a first wireless terminal in accordance with an exemplary embodiment. The first wireless terminal is, e.g., one of the wireless terminals supporting peer to peer and WAN signaling (110, 112, 114, 116, 118, . . . , 120) of system 100 of FIG. 1. Operation starts in step 1102, where the first wireless terminal is powered on and initialized. Operation proceeds from start step 1102 to step 1104. In step 1104 the first wireless terminal monitors peer discovery resources. In some embodiments, the peer discovery resources are resources in a peer to peer recurring timing structure. In some embodiments, a peer discovery resource is a fixed size set of OFDM tone-symbols in a peer discovery resource block in a peer to peer recurring frequency/timing structure. FIG. 7 and FIG. 8 illustrates exemplary peer discovery resources. Operation proceeds from step 1104 to step 1106.

In step 1106 the first wireless terminal determines a received power level for each monitored peer discovery resource. Then, in step 1108 the first wireless terminal selects a peer discovery resource to use as a function of the determined received power levels on the monitored peer discovery resources. For example, the first wireless terminal selects to use the peer discovery resource with the lowest measured received power to use for its intended peer discovery signal transmission. Operation proceeds from step 1108 to step 1110, in which the first wireless terminal transmits to a base station, e.g., WAN base station 102 of system 100 of FIG. 1, information identifying the selected peer discovery resource and peer discovery expression information communicating (i) a peer discovery expression to be communicated by said base station or (ii) an identifier identifying a peer discovery expression to be communicated by said base station. In one example, the first wireless terminal transmits information identifying the peer discovery resource that it has selected to use and the full peer discovery expression that the first wireless terminal wants the base station to advertise on its behalf. In another example, the base station already has stored in its memory the peer discovery expression that the first wireless terminal wants the base station to advertise on its behalf and it is sufficient for the first wireless terminal to transmit information identifying the peer discovery resource that the first wireless terminal has selected to use and an identifier identifying the peer discovery expression that the first wireless terminal wants the base station to advertise on its behalf. In the second example, the base station may have previously obtained the peer discovery expression from the first wireless terminal during a previous time in which the first wireless terminal was using the base station to assist in peer discovery, or the peer discovery expression may have been pre-loaded in the base station or the peer discovery expression may have been obtained from an additional node, e.g., a server, via a backhaul network based on the identifier identifying the peer discovery expression.

Operation proceeds from step 1110 to step 1112. In step 1112 the first wireless terminal receives from said base station an index to be communicated by said first wireless terminal in a peer discovery resource using said selected peer discovery resource. Operation proceeds from step 1112 to step 1114. In step 1114, the first wireless terminal transmits on said selected peer discovery resource a peer discovery signal communicating said received index. In some embodiments, the first wireless terminal transmits the peer discovery signal communicating the received index at a predetermined power level in step 1114. In some embodiments, the index is 3 bits or less. Step 1114 is performed on an ongoing basis, e.g., for each opportunity in the recurring peer to peer frequency timing structure in which the selected peer discovery resource occurs.

In some embodiments, the first wireless terminal may, and sometimes does, transmit peer discovery expression information corresponding to multiple, e.g., two, alternative peer discovery expressions in step 1110 and receive multiple index values in step 1112, each index value corresponding to a different one of the alternative peer discovery expressions. In some such embodiments, prior to transmitting the peer discovery signal in step 1114, the first wireless terminal selects which one of the plurality of alternative peer discovery expressions to communicate at a give time and then includes the received index value corresponding to the selected peer discovery expression in the peer discovery signal transmitted in step 1114. In some such embodiments, the selection of the peer discovery expression to communicate at a give time is determined based on one or more or all of: day, time, congestion level, presence of a particular peer of interest in the vicinity, presence of a peer belonging to a group of interest in the vicinity, and presence of a peer user or device having a profile of interest in the vicinity.

Operation proceeds from step 1114 to step 1118 and to step 1122, via connecting node A 1120. In step 1116, the first wireless terminal receives from the base station a broadcast signal communicating a peer discovery expression and information associating the peer discovery expression with a peer discovery resource and an index communicated in a peer discovery signal in the peer discovery resource. Operation proceeds from step 1116 to step 1118. In step 1118 the first wireless terminal stores the received peer discovery expression and information identifying the associated peer discovery resource and associated index. Operation proceeds from step 1118 to step 1116. In some embodiments, the base station's broadcast cycles through the current active sets of peer discovery expressions/information identifying the corresponding peer discovery resource/information identifying the corresponding identifier to be communicated in a peer discovery signal. In some such embodiments, a wireless terminal transmits its peer discovery signal including the index at a higher rate than the base station transmits the corresponding set of peer discovery expression/peer discovery resource identification information/index.

In various embodiments, broadcast information from the base station may, and sometimes does, provide different peer discovery expressions for different indexes corresponding to the same peer discovery resource.

Returning to step 1122, in step 1122 the first wireless terminal monitors peer discovery resources on which the first wireless terminal is not transmitting. Step 1122 is performed on an ongoing basis. Operation proceeds from step 1122 to step 1124. In step 1124 the first wireless terminal receives a peer discovery signal on a monitored peer discovery resource. Operation proceeds from step 1124 to step 1126 for each peer discovery signal which is detected. In step 1126, the first wireless terminal measures the power level of the received peer discovery signal detected on the monitored peer discovery resource. Then, in step 1128 the first wireless terminal estimates the distance to the device which transmitted the received peer discovery signal based on the received power level of the detected peer discovery signal. Operation proceeds from step 1128 to step 1130.

In step 1130 the first wireless terminal attempts to decode the index communicated in the received peer discovery signal. Step 1130 may, and sometimes does, include step 1132 in which the first wireless terminal recovers the index being communicated in the received peer discovery signal. Operation proceeds from step 1130 to step 1134.

In step 1134 the first wireless terminal determines whether or not the first wireless terminal has successfully decoded the index value being communicated in the received peer discovery signal. If the first wireless terminal has not successfully decoded the index, then operation proceeds from step 1134 to step 1160, in which the first wireless terminal ends further processing operations with regard to this detected peer discovery signal. However, if the first wireless terminal has successfully decoded the index communicated in the received peer discovery signal, then operation proceeds from step 1134, via connecting node B 1136, to step 1137.

In step 1137 the first wireless terminal determines based on the peer discovery resource on which the peer discovery signal was received and the decoded index a corresponding peer discovery expression. Step 1137 includes step 1138, 1140, 1142, 1144 and 1146. In step 1138 the first wireless terminal determines if there is stored information mapping the resource/index combination to a peer discovery expression. If there is already stored information in the first wireless terminal mapping the resource on the which the peer discovery signal was received and the decoded index to a peer discovery expression, then operation proceeds from step 1138 to step 1140. In step 1140 the first wireless terminal looks up the peer discovery expression corresponding to the peer discovery resource on which the peer discovery signal was received and the decoded index.

Returning to step 1138, in step 1138 if it is determined that there is not currently stored information in the first wireless terminal mapping the resource/index combination to a peer discovery expression, then operation proceeds from step 1138 to step 1142. In step 1142 the first wireless terminal sends a request signal to the base station requesting the peer discovery expression corresponding to the peer discovery resource on which the peer discovery signal was received and the decoded index value. Operation proceeds from step 1142 to step 1144, in which the first wireless terminal receives a response signal from the base station communicating the requested peer discovery expression. Operation proceeds from step 1144 to step 1146 in which the first wireless terminal stores the received peer discovery expression and information identifying the corresponding peer discovery resource and index associated with the peer discovery expression.

Operation proceeds from step 1137 to step 1148. In step 1148 the first wireless terminal determines based on the estimated distance to the device which transmitted the peer discovery signal and the determined peer discovery expression whether or not to perform a peer to peer communications operation. When the first wireless terminal decides to perform a peer to peer communications operation based on the determination of step 1148, operation may, and sometimes does proceed from step 1148 to one of steps 1150 and step 1152. In step 1150 the first wireless terminal establishes a peer to peer connection with the wireless terminal which transmitted the peer discovery signal. In step 1152 the first wireless terminal continues to maintain an established peer to peer connection with the wireless terminal which transmitted the received peer discovery signal. Operation may, and sometimes does, proceed from step 1150 or 1152 to step 1154. In step 1154 the first wireless terminal performs one or more of: (i) transmitting a peer to peer traffic signal to the wireless terminal which transmitted the received peer discovery signal or (ii) receiving a peer to peer traffic signal from the wireless terminal which transmitted the received peer discovery signal.

Figure 12:
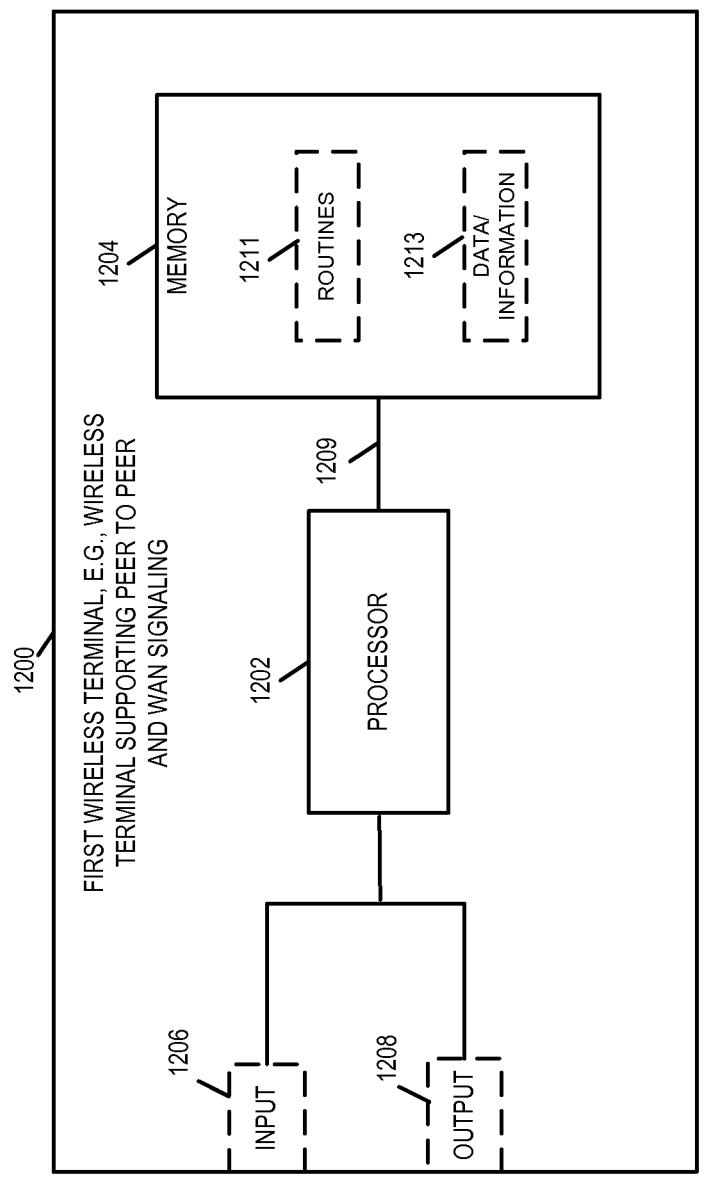
FIG. 12 is a drawing of an exemplary first wireless terminal, e.g., a mobile node supporting peer to peer communications and WAN communications, in accordance with an exemplary embodiment.

FIG. 12 is a drawing of an exemplary first wireless terminal 1200, e.g., a mobile wireless terminal supporting peer to peer and WAN signaling, in accordance with an exemplary embodiment. Exemplary first wireless terminal 1200 is, e.g., one of the wireless terminals of system 100 of FIG. 1 which support both peer to peer and WAN signaling. Exemplary first wireless terminal 1200 may, and sometimes does, implement a method in accordance with flowchart 1100 of FIG. 11.

First wireless terminal 1200 includes a processor 1202 and memory 1204 coupled together via a bus 1209 over which the various elements (1202, 1204) may interchange data and information. Communications device 1200 further includes an input module 1206 and an output module 1208 which may be coupled to processor 1202 as shown. However, in some embodiments, the input module 1206 and output module 1208 are located internal to the processor 1202. Input module 1206 can receive input signals. Input module 1206 can, and in some embodiments does, include a wireless receiver and/or a wired or optical input interface for receiving input. Output module 1208 may include, and in some embodiments does include, a wireless transmitter and/or a wired or optical output interface for transmitting output. In some embodiments, memory 1204 includes routines 1211 and data/information 1213.

Figures 13, 13A:
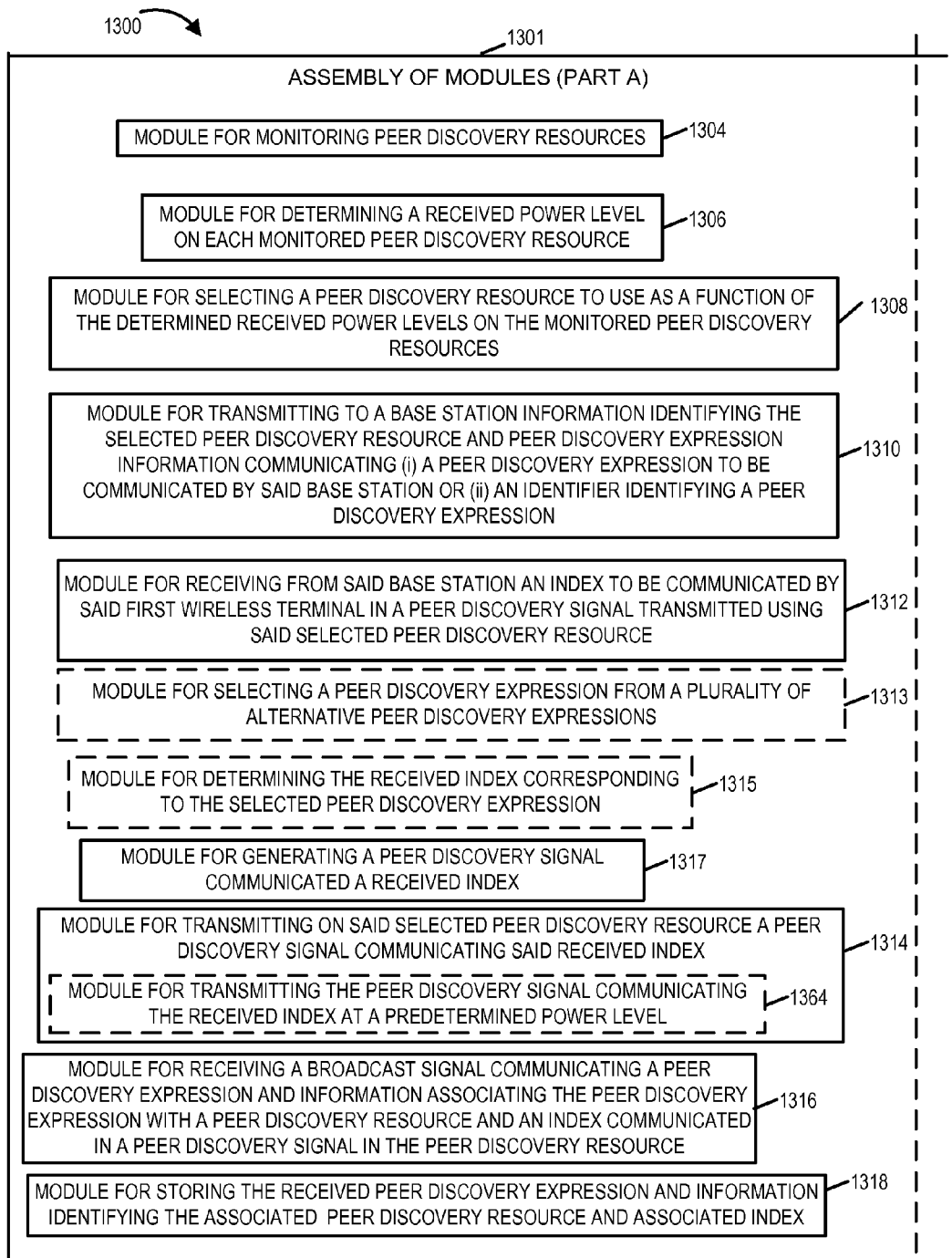
FIG. 13A is a first portion of an assembly of modules which can, and in some embodiments is, used in the exemplary first wireless terminal illustrated in FIG. 12.
Figure 13B:
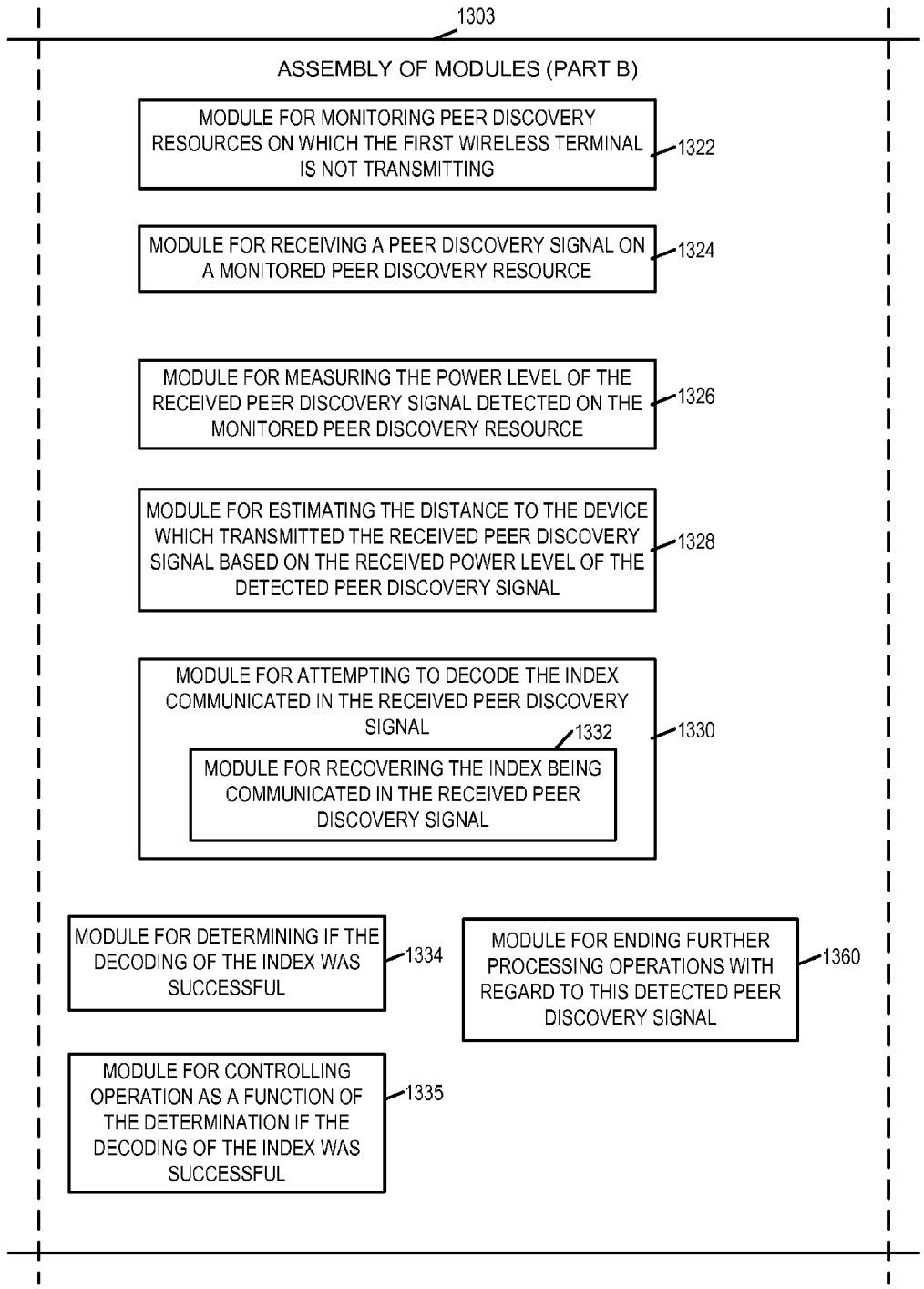
FIG. 13B is a second portion of an assembly of modules which can, and in some embodiments is, used in the exemplary first wireless terminal illustrated in FIG. 12.
Figure 13C:
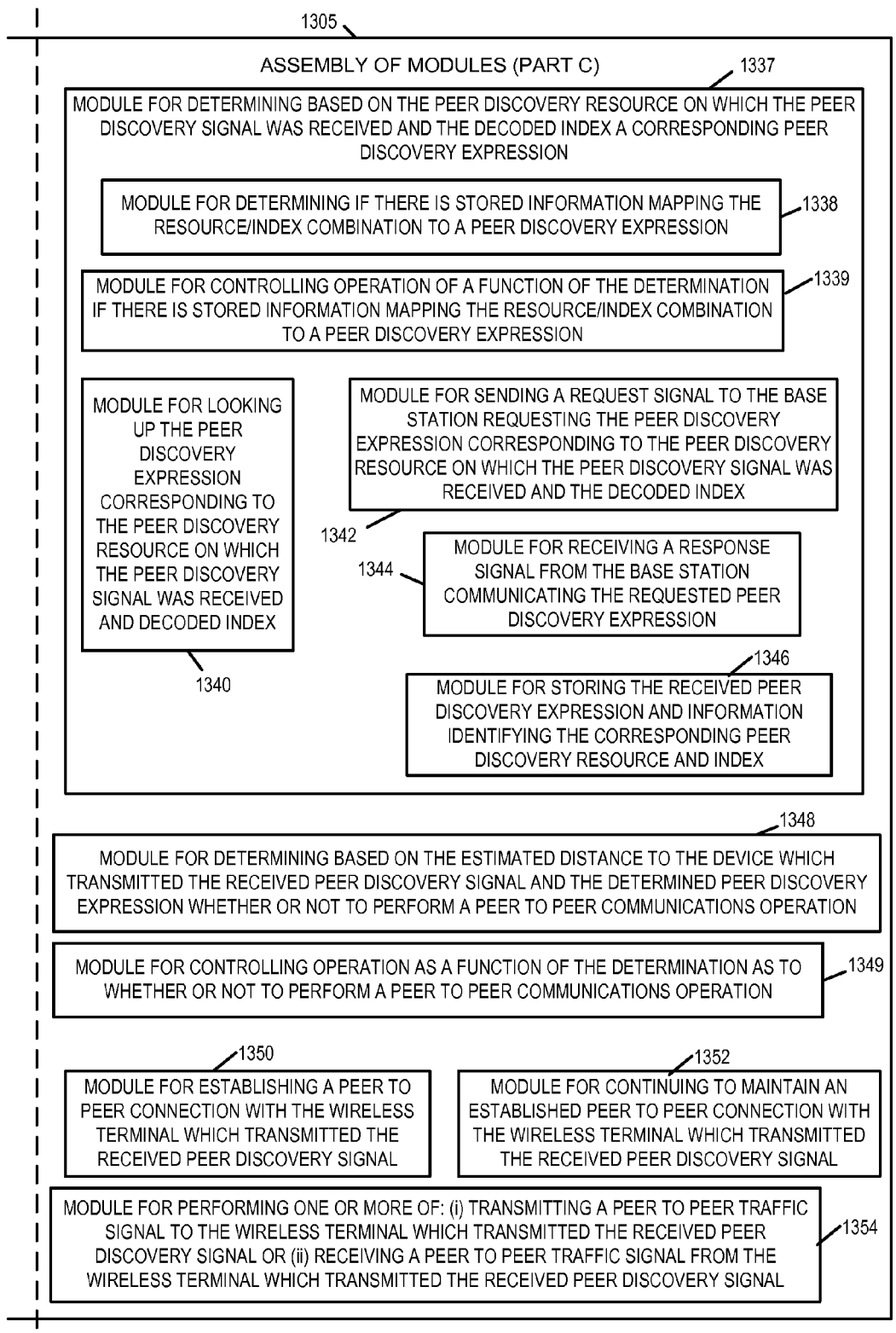
FIG. 13C is a third portion of an assembly of modules which can, and in some embodiments is, used in the exemplary first wireless terminal illustrated in FIG. 12.

FIG. 13, comprising the combination of part A 1301, part B 1303 and part C 1305, is an assembly of modules 1300 which can, and in some embodiments is, used in the exemplary first wireless terminal 1200 illustrated in FIG. 12. The modules in the assembly 1300 can be implemented in hardware within the processor 1202 of FIG. 12, e.g., as individual circuits. Alternatively, the modules may be implemented in software and stored in the memory 1204 of wireless terminal 1200 shown in FIG. 12. In some such embodiments, the assembly of modules 1300 is included in routines 1211 of memory 1204 of device 1200 of FIG. 12. While shown in the FIG. 12 embodiment as a single processor, e.g., computer, it should be appreciated that the processor 1202 may be implemented as one or more processors, e.g., computers. When implemented in software the modules include code, which when executed by the processor, configure the processor, e.g., computer, 1202 to implement the function corresponding to the module. In some embodiments, processor 1202 is configured to implement each of the modules of the assembly of modules 1300. In embodiments where the assembly of modules 1300 is stored in the memory 1204, the memory 1204 is a computer program product comprising a computer readable medium, e.g., a non-transitory computer readable medium, comprising code, e.g., individual code for each module, for causing at least one computer, e.g., processor 1202, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 13 control and/or configure the wireless terminal 1200 or elements therein such as the processor 1202, to perform the functions of the corresponding steps illustrated and/or described in the method of flowchart 1100 of FIG. 11.

Assembly of modules 1300 includes a module for monitoring peer discovery resources 1304, a module for determining a received power level of each monitored peer discovery resource 1306, a module for selecting a peer discovery resource to use as a function of the determined received power levels on the monitored peer discovery resources 1308, and a module for transmitting to a base station information identifying the selected peer discovery resource and peer discovery expression information communicating: (i) a peer discovery expression to be communicated from the base station or (ii) an identifier identifying a peer discovery expression to be communicated by said base station, and a module for receiving from said base station an index to be communicated by said first wireless terminal in a peer discovery signal transmitted using said selected peer discovery resource.

In some embodiments, module 1310 may, and sometimes does, communicate peer discovery expression information corresponding to multiple, e.g., two, alternative peer discovery expressions, and module 1312 may, and sometimes does, receive different received index values corresponding to the different peer discovery expressions. In some embodiments, assembly of modules 1300 further includes a module for selecting a peer discovery expression from a plurality of alternative peer discovery expressions 1313 and a module for determining the received index corresponding to the selected peer discovery expression 1315. In some embodiments, module 1313 selects a peer discovery expression at a particular time as a function of one or more or all of: schedule information, e.g. date information, time information, device location information, device proximity information, congestion information, detection of a device or user of interest, detection of a device or use belonging to a group of interest, detection of a device having a profile of interest, and estimated direction of motion of a device of interest, Assembly of modules 1300 further includes a module for generating a peer discovery expression communicating a received index 1317. In some embodiments, module 1317 uses a single received index received by module 1312. In some embodiments, module 1317 uses the determined received index determined by module 1315. The output of module 1317 is the input to module 1314.

Assembly of modules 1300 further includes a module for transmitting on said selected peer discovery resource a peer discovery signal communicating said received index 1314. In some embodiments module 1314 includes a module for transmitting a peer discovery signal communicating said received index at a predetermined power level 1364. Assembly of modules 1300 further includes a module for receiving a broadcast signal communicating a peer discovery expression and information associating the peer discovery expression with a peer discovery resource and an index communicated in a peer discovery signal in a peer discovery resource. In various embodiments, the broadcast signals received by module 1316 are from a base station. Assembly of modules 1318 further includes a module for storing the received peer discovery expression and information identifying the associated peer discovery resource and associated index 1318.

Assembly of modules 1300 further includes a module for monitoring peer discovery resource on which the first wireless terminal is not transmitting 1322, a module for receiving a peer discovery signal on a monitored peer discovery resource 1324, a module for measuring the power level of the received peer discovery signal detected on the monitored peer discovery resource 1326, and a module for estimating the distance to the device which transmitted the received peer discovery signal based on the received power level of the detected peer discovery signal 1328. Module 1330 includes a module for receiving the index being communicated in the received peer discovery signal 1332.

Assembly of modules 1300 further includes a module for determining of the decoding of the index was successful 1334, a module for controlling operation as a function of the determination if the decoding of the index was successful

1335 and a module for ending further processing operations with regard to this detected peer discovery signal in response to an unsuccessful decode of the index 1360. Assembly of modules further includes a module for determining based on the peer discovery resource on which the peer discovery signal was received and the decoded index a corresponding peer discovery expression 1337. Module 1337 includes a module for determining if there is stored information mapping the resource/index combination to a peer discovery expression 1338, a module for controlling operation as a function of the determination if there is stored information in the first wireless terminal mapping the resource/index combination to a peer discovery expression 1339, and a module for looking up the peer discovery expression corresponding to the peer discovery resource on which the peer discovery signal was received and the decoded index 1340. Module 1337 further includes a module for sending a request signal to the base station requesting the peer discovery expression corresponding to the peer discovery resource on which the peer discovery signal was received and the decoded index 1342, a module for receiving a response signal from the base station communicating the requested peer discovery expression 1344 and a module for storing the received peer discovery expression and information identifying the corresponding peer discovery resource and index 1346.

Assembly of modules 1300 further includes a module for determining based on the estimated distance to the device which transmitted the received peer discovery signal and the determined peer discovery expression whether or not to perform a peer to peer communications operation 1348, a module 1349 for controlling operation based on the determination of module 1348, a module for establishing a peer to peer connection with the wireless terminal which transmitted the received peer discovery signal, 1350, a module for continuing to maintain an established peer to peer connection with the wireless terminal which transmitted the received peer discovery signal 1352, and a module for performing one or more of: transmitting a peer to peer signal to the wireless terminal which transmitted the received peer discovery signals or (ii) receiving a peer to peer traffic signal from the wireless terminal which transmitted the received peer discovery signal 1354.

Figure 14:
FIG. 14 is a drawing of an exemplary stored look-up table for peer discovery expressions in accordance with an exemplary embodiment.

FIG. 14 is a drawing of an exemplary stored look-up table for peer discovery expressions 1400 in accordance with an exemplary embodiment. Exemplary look-up table 1400 is stored, e.g. in memory, in an exemplary wireless terminal supporting peer to peer and WAN signaling, e.g., a WT 1 904 of FIG. 9, a first wireless terminal 300 of FIG. 3 and/or first wireless terminal 1200 of Figure. Entries in the exemplary look-up table 1400 are acquired over time by the wireless terminal. First column 1402 identifies the peer discovery resource; second column 1404 lists the index information bit pattern; third column 1406 lists the index value; and fourth column 1408 lists the expression and identifies how many information bits are used for the expression An index value=1, which corresponds to an index information bit pattern of 00, which is communicated in a peer discovery signal on peer discovery resource R1 corresponds to peer discovery expression E1 which is a 128 information bit expression. An index value=2, which corresponds to an index information bit pattern of 01, which is communicated in a peer discovery signal on peer discovery resource R1 corresponds to peer discovery expression E8 which is a 64 information bit expression. An index value=3, which corresponds to an index information bit pattern of 10, which is communicated in a peer discovery signal on peer discovery resource R1 corresponds to peer discovery expression E10 which is a 64 information bit expression. An index value=4, which corresponds to an index information bit pattern of 11, which is communicated in a peer discovery signal on peer discovery resource R1 corresponds to peer discovery expression E6 which is a 64 information bit expression.

An index value=1, which corresponds to an index information bit pattern of 00, which is communicated in a peer discovery signal on peer discovery resource R2 corresponds to peer discovery expression E5 which is a 64 information bit expression. An index value=2, which corresponds to an index information bit pattern of 01, which is communicated in a peer discovery signal on peer discovery resource R2 corresponds to peer discovery expression E2 which is a 64 information bit expression. An index value=3, which corresponds to an index information bit pattern of 10, which is communicated in a peer discovery signal on peer discovery resource R2 corresponds to peer discovery expression E7 which is a 64 information bit expression. An index value=4, which corresponds to an index information bit pattern of 11, which is communicated in a peer discovery signal on peer discovery resource R2 corresponds to peer discovery expression E12 which is a 256 information bit expression.

An index value=1, which corresponds to an index information bit pattern of 00, which is communicated in a peer discovery signal on peer discovery resource R3 corresponds to peer discovery expression E3 which is a 64 information bit expression. An index value=2, which corresponds to an index information bit pattern of 01, which is communicated in a peer discovery signal on peer discovery resource R3 corresponds to peer discovery expression E11 which is a 64 information bit expression. An index value=3, which corresponds to an index information bit pattern of 10, which is communicated in a peer discovery signal on peer discovery resource R3 corresponds to peer discovery expression E9 which is a 64 information bit expression. An index value=4, which corresponds to an index information bit pattern of 11, which is communicated in a peer discovery signal on peer discovery resource R3 corresponds to peer discovery expression E4 which is a 512 information bit expression.

In this example, each of the available indexes in resources R1, R2, and R3 are currently being used. However, at times some of the resource/index combinations may be in use and some may be unused. In this example, peer discovery expression size may, and sometimes does vary. In some other embodiments, each peer discovery expression is the same predetermined fixed size. In this example, the index is two information bits. In another exemplary embodiment, the index is 3 information bits.

Exemplary look-up table 1400 may change over time, e.g., as new wireless terminals enter the system, as wireless terminals power down, as wireless terminal leave the coverage area, and in response to changes of wireless terminal position within the base station coverage area.

In various embodiments a device, e.g., a mobile wireless terminal supporting WAN and peer to peer signaling in system 100 of FIG. 1, and/or communication device 300 of FIG. 3, and/or a wireless terminal supporting WAN and peer to peer signaling of FIG. 5 or FIG. 6 or FIG. 9 or FIG. 10, and/or wireless terminal 1200 of FIG. 12 and/or one of the wireless terminals of any of the Figures includes a module corresponding to each of the individual steps and/or operations described with regard to any of the Figures in the present application and/or described in the detailed description of the present application. In some embodiments, the modules are implemented in hardware, e.g., in the form of circuits. Thus, in at least some embodiments the modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., network nodes, mobile nodes such as mobile terminals supporting peer to peer communications, access points such as base stations, and/or communications systems. Various embodiments are also directed to methods, e.g., method of controlling and/or operating network nodes, mobile nodes, access points such as base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as network nodes, access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., a communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., WiFi signaling protocol or another OFDM based protocol.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first wireless terminal comprising:
transmitting first peer to peer discovery expression information to a base station, said first peer to peer discovery expression information communicating a first peer to peer discovery expression or an identifier identifying said first peer to peer discovery expression, the first peer to peer discovery expression to be communicated by said base station in association with a first index and a first peer to peer communications resource identifier identifying a first peer to peer discovery communications resource being used by said first wireless terminal;

receiving from said base station, in response to the transmitted peer to peer discovery expression information, said first index associated with said first peer to peer discovery expression and with the first peer to peer discovery communications resource being used by said first wireless terminal; and transmitting said first index in the first peer to peer discovery communications resource identified by said first peer to peer communications resource identifier to thereby identify the first peer to peer discovery expression.

2. The method of claim 1, wherein transmitting said first index in the first peer to peer communications resource includes transmitting said first index at a predetermined power level.

3. The method of claim 2, wherein said first index is 3 bits or less.

4. The method of claim 1, further comprising:
receiving, on a second peer to peer communications resource, a signal from a second wireless terminal communicating a second index; and
measuring the power of the received signal.

5. The method of claim 4, further comprising:
determining, based on the second peer to peer communications resource on which said signal is received from the second wireless terminal and the second index communicated by said received signal, peer discovery information corresponding to said second wireless terminal.

6. The method of claim 5, wherein determining, based on the resource on which said signal is received from the second wireless terminal and the second index communicated by said received signal, peer discovery information corresponding to said second wireless terminal includes:
looking up a second peer to peer discovery expression corresponding to said second peer to peer communications resource and said second index from information received from the base station mapping said second communications resource and said second index to said second peer to peer discovery expression.

7. The method of claim 6, further comprising:
receiving said information, mapping said second communications resource and said second index to the second peer to peer discovery expression in a broadcast signal transmitted by said base station.

8. The method of claim 7, wherein the broadcast information provides different peer discovery expressions for different indexes corresponding to said second peer to peer communications resource.

9. The method of claim 6, further comprising:
receiving said information mapping said second communications resource and said second index to said second peer to peer discovery expression in a response signal transmitted by said base station information in response to a request signal including said second identifier of said second peer to peer communications resource and said second index transmitted to said base station from said second wireless terminal.

10. A first wireless terminal comprising:
means for transmitting first peer to peer discovery expression information to a base station, said first peer to peer discovery expression information communicating a first peer to peer discovery expression or an identifier identifying said first peer to peer discovery expression, the first peer to peer discovery expression to be communicated by said base station in association with a first index and a first peer to peer communications resource identifier identifying a first peer to peer discovery communications resource being used by said first wireless terminal;

means for receiving from said base station, in response to the transmitted peer to peer discovery expression information, said first index associated with said first peer to peer discovery expression and with the first peer to peer discovery communications resource being used by said first wireless terminal; and means for transmitting said first index in the first peer to peer discovery communications resource identified by said first peer to peer communications resource identifier to thereby identify the first peer to peer discovery expression.

11. The first wireless terminal of claim 10, wherein said means for transmitting said first index in the first peer to peer communications resource includes means for transmitting said first index at a predetermined power level.

12. The first wireless terminal of claim 11, wherein said first index is 3 bits or less.

13. The first wireless terminal of claim 10, further comprising:
means for receiving, on a second peer to peer communications resource, a signal from a second wireless terminal communicating a second index; and
means for measuring the power of the received signal.

14. The first wireless terminal of claim 13, further comprising:
means for determining, based on the second peer to peer communications resource on which said signal is received from the second wireless terminal and the second index communicated by said received signal, peer discovery information corresponding to said second wireless terminal.

15. A computer program product for use in a first wireless terminal, the computer program product comprising:
a non-transitory computer readable medium comprising:
code for causing at least one computer to transmit first peer to peer discovery expression information to a base station, said first peer to peer discovery expression information communicating a first peer to peer discovery expression or an identifier identifying said first peer to peer discovery expression, the first peer to peer discovery expression to be communicated by said base station in association with a first index and a first peer to peer communications resource identifier identifying a first peer to peer discovery communications resource being used by said first wireless terminal;

code for causing said at least one computer to receive from said base station, in response to the transmitted peer to peer discovery expression information, said first index associated with said first peer to peer discovery expression and with the first peer to peer discovery communications resource being used by said first wireless terminal; and code for causing said at least one computer to transmit said first index in the first peer to peer discovery communications resource identified by said first peer to peer communications resource identifier to thereby identify the first peer to peer discovery expression.

16. A first wireless terminal comprising:
at least one processor configured to:
- transmit first peer to peer discovery expression information to a base station, said first peer to peer discovery expression information communicating a first peer to peer discovery expression or an identifier identifying said first peer to peer discovery expression, the first peer to peer discovery expression to be communicated by said base station in association with a first index and a first peer to peer communications resource identifier identifying a first peer to peer discovery communications resource being used by said first wireless terminal;
- receive from said base station, in response to the transmitted peer to peer discovery expression information, said first index associated with said first peer to peer discovery expression and with the first peer to peer discovery communications resource being used by said first wireless terminal; and
- transmit said first index in the first peer to peer discovery communications resource identified by said first peer to peer communications resource identifier to thereby identify the first peer to peer discovery expression; and memory coupled to said at least one processor.

17. The first wireless terminal of claim 16, wherein said at least one processor is configured to transmit said first index at a predetermined power level, as part of being configured to transmit said first index in the first peer to peer communications resource.

18. The first wireless terminal of claim 17, wherein said first index is 3 bits or less.

19. The first wireless terminal of claim 16, wherein said at least one processor is further configured to:
- receive, on a second peer to peer communications resource, a signal from a second wireless terminal communicating a second index; and
- measure the power of the received signal.

20. The first wireless terminal of claim 19, wherein said at least one processor is further configured to:
- determine, based on the second peer to peer communications resource on which said signal is received from the second wireless terminal and the second index communicated by said received signal, peer discovery information corresponding to said second wireless terminal.

* * * * *